(12) United States Patent
Tian

(10) Patent No.: US 11,932,383 B2
(45) Date of Patent: Mar. 19, 2024

(54) VERTICAL TAKEOFF AND LANDING AERIAL VEHICLE AND COOLING SYSTEM

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Shanghai (CN)

( * ) Notice: Subject to any disclaimer, the term of this patent is extended or adjusted under 35 U.S.C. 154(b) by 285 days.

(21) Appl. No.: 17/396,701

(22) Filed: Aug. 8, 2021

(65) Prior Publication Data

US 2022/0041275 A1    Feb. 10, 2022

(30) Foreign Application Priority Data

Aug. 7, 2020   (CN) .......................... 202021631693.1
Oct. 29, 2020  (CN) .......................... 202022452410.3

(51) Int. Cl.
| | | |
|---|---|---|
| B64C 29/00 | (2006.01) | |
| B64C 39/02 | (2023.01) | |
| B64U 30/20 | (2023.01) | |
| B64U 70/80 | (2023.01) | |

(52) U.S. Cl.
CPC ........ *B64C 29/0016* (2013.01); *B64C 39/024* (2013.01); *B64U 30/20* (2023.01); *B64U 70/80* (2023.01)

(58) Field of Classification Search
CPC ... B64C 29/0016; B64C 39/024; B64U 70/80; B64U 30/20
See application file for complete search history.

(56) References Cited

U.S. PATENT DOCUMENTS

| | | | |
|---|---|---|---|
| 2006/0151666 A1* | 7/2006 | VanderMey | ........ B64C 29/0016 244/12.3 |
| 2019/0127056 A1* | 5/2019 | Weekes | .................... B64D 9/00 |
| 2021/0155350 A1* | 5/2021 | Kwon | ............... H01M 10/6562 |
| 2021/0362867 A1* | 11/2021 | Tian | ........................ B64U 10/13 |
| 2022/0227490 A1* | 7/2022 | Tian | ....................... B64D 33/08 |

\* cited by examiner

*Primary Examiner* — Justin M Benedik
(74) *Attorney, Agent, or Firm* — WPAT LAW. P.C.; Anthony King

(57) ABSTRACT

A vertical takeoff and landing aerial vehicle and a cooling system for the aerial vehicle. The vertical takeoff and landing aerial vehicle comprises at least one air inlet provided on the top side of a linear support below a lift propeller, and at least one air outlet provided on the linear support. In the vertical takeoff and landing stage of the aerial vehicle provided by the disclosure, airflow generated by rotation of a lift propeller forms a rapid-flowing spatial flow field, which can achieve efficient heat dissipation of a motor and an electronic speed controller in an arm; and in the vertical takeoff and landing unmanned aerial vehicle provided by the utility, the takeoff weight of the unmanned aerial vehicle cannot be increased, power consumption of airborne equipment cannot be increased, and interior space of the arm cannot be occupied.

9 Claims, 25 Drawing Sheets

VERTICAL TAKEOFF AND LANDING AERIAL VEHICLE AND COOLING SYSTEM

TECHNICAL FIELD

The utility model relates to the technology of unmanned aerial vehicles, and in particular to a vertical takeoff and landing (VTOL) unmanned aerial vehicle and a cooling system for the unmanned aerial vehicle.

BACKGROUND

Heat productivity in the vertical takeoff and landing stage of an unmanned aerial vehicle is large during the working period of a lift motor and an electronic speed controller of an existing vertical takeoff and landing unmanned aerial vehicle, an arm structure of the existing unmanned aerial vehicle is generally a closed cavity structure, which is not conducive to heat dissipation of the motor and the electronic speed controller. In addition, an interior space of an arm of the existing vertical takeoff and landing unmanned aerial vehicle is limited, and the motor and the electronic speed controller have occupied most of the interior space, the heat dissipation of equipment is not facilitated. Due to strict limitation on the takeoff weight, additional heat dissipation equipment may be not installed on the existing vertical takeoff and landing unmanned aerial vehicle. The arm of the existing vertical takeoff and landing unmanned aerial vehicle is generally a closed cavity structure, which is not conducive to the heat dissipation of the equipment is not facilitated.

SUMMARY

The utility model relates to a vertical takeoff and landing unmanned aerial vehicle and a cooling system for the unmanned aerial vehicle, which are used for solving the problem of poor heat dissipation of a motor and an electric speed controller in an arm of an unmanned aerial vehicle in the prior art.

The utility model provides a vertical takeoff and landing unmanned aerial vehicle, which comprises:
a left main wing and a right main wing;
a left front wing and a right front wing;
a main body which is engaged with the left main wing and the right main wing;
a left linear support for connecting the left main wing with the left front wing;
a right linear support for connecting the right main wing with the right front wing;
a first group of multiple lift propellers which are arranged on the left linear support, each lift propeller in the first group of multiple lift propellers having a radius of gyration;
a second group of multiple lift propellers which are arranged on the right linear support, each lift propeller in the second group of multiple lift propellers having a radius of gyration;
wherein the left linear support and the right linear support each have a hollow interior;
wherein a plurality of motors are arranged in the hollow interior of each of the left linear support and the right linear support;
at least one air inlet which is provided below at least one lift propeller in the first group of multiple lift propellers and the second group of multiple lift propellers and provided on the top side of each of the left linear support and the right linear support; and
at least one air outlet which is provided on each of the left linear support and the right linear support, thereby allowing air to pass from the hollow interior to an external environment.

In one embodiment of the utility model, the at least one air outlet is provided on the top side of each of the left linear support and the right linear support below the radius of gyration.

In one embodiment of the utility model, the first group of multiple lift propellers and the second group of multiple lift propellers rotate to generate a downward airflow towards the at least one air inlet.

In one embodiment of the utility model, the at least one air outlet is provided on the bottom side of each of the left linear support and the right linear support.

In one embodiment of the utility model, the air outlet is located below the motor.

In one embodiment of the utility model, the at least one air inlet is provided on the underside of an outer 75% portion of the radius of gyration.

In one embodiment of the utility model, the at least one air outlet is provided on the underside of an inner 25% portion of the radius of gyration.

In one embodiment of the utility model, the at least one air outlet is provided on the underside of an inner 25% portion of the radius of gyration.

In one embodiment of the utility model, the at least one air outlet is a circular gap which surrounds a rotating shaft of at least one lift propeller of the first group of multiple lift propellers and the second group of multiple lift propellers.

In one embodiment of the utility model, the at least one air inlet is an oblong hole.

In one embodiment of the utility model, a plurality of air inlets are provided on the left linear support and the right linear support respectively, the length directions of the air inlets on the left linear support are parallel to the axis of the left linear support, the length directions of the air inlets on the right linear support are parallel to the axis of the right linear support, and the plurality of air inlets on the left linear support and the right linear support are arranged in an array manner.

In one embodiment of the utility model, no other openings are provided on the left linear support and the right linear support, and thus the air may flow through the at least one air inlet and the at least one air outlet.

In one embodiment of the utility model, each of the left linear support and the right linear support is a closed cylinder, a cylinder wall of the cylinder is only provided with an air inlet and an installation hole, the air inlet is an oblong hole, a propeller hub of the lift propeller is located in the installation hole, and an air outlet is formed between the propeller hub of the lift propeller and the hole wall of the installation hole.

In one embodiment of the utility model, the two ends of the left linear support are formed as a tapered structure, and apex of the tapered structure is located on the axis of the left linear support; two ends of the right linear support are formed as a tapered structure, and apex of the tapered structure is located on the axis of the right linear support.

A cooling system for an unmanned aerial vehicle, comprising:
a plurality of lift propellers which are arranged on a linear support;

wherein the linear support is hollow and capable of accommodating a plurality of motors to drive the lift propellers;

and a plurality of air inlets which are provided on the top side of the linear support and below at least one lift propeller in the plurality of lift propellers;

wherein the plurality of lift propellers rotate to generate a downward airflow towards the plurality of air inlets, thereby making the air escape to an external environment from a hollow interior of the linear support through an air outlet.

In one embodiment of the utility model, the air outlet is provided on the linear support and close to one of the plurality of motors.

In one embodiment of the utility model, no other openings for air circulation are provided on the portion, that is not the linear support below, of the lift propeller.

In one embodiment of the utility model, the downward airflow enters through the plurality of air inlets and flows through at least one of the plurality of motors.

In one embodiment of the utility model, the air outlet is a circular gap surrounding a shaft of at least one motor in the plurality of motors.

According to a vertical takeoff and landing unmanned aerial vehicle of the utility model, through a mode of forming holes in the upper side of a lift motor arm, the holes are located in front of and behind an installation position of a lift motor respectively, and then airflow generated by rotation of a propeller in the vertical takeoff and landing stage of the unmanned aerial vehicle is utilized to enable downward-pressing airflow generated by the propeller to accelerate air flow around the hole area, and to form convection between an original closed inner cavity structure of the vertical take-off and landing unmanned aerial vehicle and the atmospheric environment, thereby generating a rapid-flowing spatial flow field, which is in favor of diffusing heat, generated by the lift motor and an electronic speed controller, of the vertical takeoff and landing unmanned aerial vehicle into the air more quickly, the purpose of efficient heat dissipation of the motor and the electronic speed controller in the arm may be achieved; and in the vertical takeoff and landing unmanned aerial vehicle provided by the utility, the takeoff weight of the unmanned aerial vehicle cannot be increased, power consumption of airborne equipment cannot be increased, and interior space of the arm cannot be occupied.

Although this specification includes many specific implementation details, these should not be construed as limitations on the scope of any utility model or of what may be claimed, but rather as descriptions specific to features of particular implementations of particular embodiments. Certain features that are described in the context of different implementations in this specification may also be implemented in combination in a separate implementation. In contrast, various features described in the context of the separate implementation may also be implemented in multiple implementations separately or in any appropriate sub-combination. In addition, although the features may be described above and below as acting in certain combinations and even initially described as such, one or more features from a described/claimed combination may be excised from the combination in certain cases, and the described/claimed combination may be directed to a sub-combination or variations of the sub-combination.

Many implementations have been described. However, it should be understood that various modifications may be made without departing from the spirit and scope of the utility model. For example, the example operations, methods, or processes described herein may comprise more steps or less steps than those described. In addition, the steps in these example operations, methods, or processes may be performed in different alternative ways than those described or illustrated in the figures.

The details of one or more implementations of a subject matter described in the utility model are set forth in the accompanying drawings and the description below. Other features, aspects and advantages of the subject matter will become apparent in accordance with the specification, and the accompanying drawings.

BRIEF DESCRIPTION OF THE DRAWINGS

It should be noted that the accompanying drawings may be in simplified form and may not be precise in scale. With reference to the disclosure herein, for purposes of convenience and clarity only, directional terms such as top, bottom, left, right, up, down, upper side, above, beneath, below, rear portion, front portion, distal end, and proximal end are used with reference to the accompanying drawings. These directional terms should not be construed to limit the scope of the embodiments in any way.

FIG. 1b is a partial schematic view of an air outlet and air inlets of the unmanned aircraft system illustrated in FIG. 1a;

Where reference is made to components with reference numerals, like parts are denoted by the same reference numerals throughout the accompanying drawings of the specification:

Figure 1A:
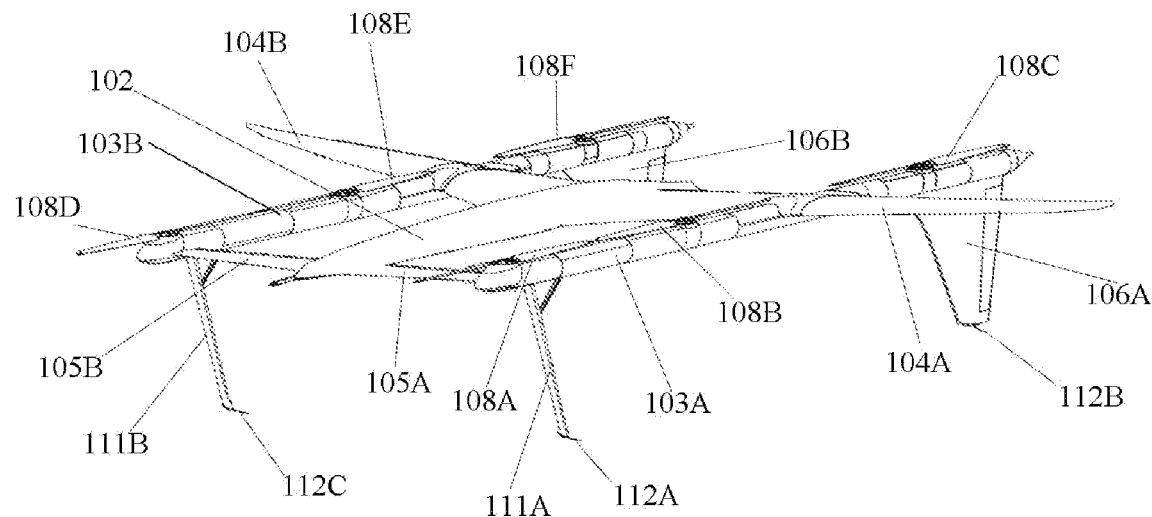
FIG. 1a is a top perspective view of an embodiment of a VTOL (vertical takeoff and landing) unmanned aircraft system in accordance with one aspect of an embodiment.

100—unmanned aerial vehicle; 101—flight platform; 102—main body; 103A—left linear support; 103B—right linear support; 104A—left main wing; 104B—right main wing; 105A—left front wing; 105B—right front wing; 106A—left vertical stabilizer; 106B—right vertical stabilizer; 107—propulsion propeller; 107A—left propulsion propeller; 107B—right propulsion propeller; 108A—first lift propeller; 108B—second lift propeller; 108C—third lift propeller; 108D—fourth lift propeller; 108E—fifth lift propeller; 108F—sixth lift propeller; 109A—left wingtip propeller; 109B—right wingtip propeller; 110A—left wingtip vertical stabilizer; 110B—right wingtip vertical stabilizer; 111A—left folding leg; 111B—right folding leg; 112A—first leaf spring; 112B—second leaf spring; 112C—third leaf spring; 112D—fourth leaf spring; 116—vertical expander; 117—central propulsion propeller; 130—cargo pod; 135A—first pod leaf spring; 135B—second pod leaf spring; 135C—third pod leaf spring; 135D—fourth pod leaf spring; 140—passenger pod; 145A—pod leg; 145B—pod leg; 145C—pod leg; 145D—pod leg; 147—pod-attaching latch; 148—electric wheel; 149—shell; 150—energy storage unit in flight platform; 155—energy storage unit in pod; 160—flotation device; 170A—front air inlet; 170B—rear air inlet; 180—electronic speed controller; 190—motor; 200—air outlet; 201—aileron; A—airflow direction; B—air inlet area; C—air outlet area.

DETAILED DESCRIPTION OF THE EMBODIMENTS

Different aspects of various embodiments may now be better understood by turning to the following detailed description of the embodiments, which are presented as illustrative examples of the embodiments defined in the technical solutions. It is expressly understood that the embodiments defined by the technical solutions may be broader than the illustrated embodiments described below.

The words used in the specification to describe the various embodiments should be understood to not only have commonly defined meanings thereof, but, in structures, materials, or actions in the specification, to include special definitions beyond the scope of the generally defined meanings. Hence, if a component may be understood in the context of the specification to include more than one meaning, its use in the technical solution must be understood to be general for all possible meanings supported by the specification and the words themselves.

The term "unmanned aerial vehicle" is defined as a flight transportation system with at least one propeller as one propulsion source. The term "unmanned aerial vehicle" may comprise both "manned" and "unmanned" flight transportation systems. The "manned" unmanned aerial vehicle may refer to a flight transportation system that carries human passengers, none of which has right of control over the unmanned aerial vehicle. The "manned" unmanned aerial vehicle may also refer to a flight transportation system that carries human passengers, with some or one of the human passengers having a certain right of control over the unmanned aerial vehicle.

As the background, heat productivity in the vertical takeoff and landing stage of an unmanned aerial vehicle is large during the working period of a lift motor and an electronic speed controller of an existing vertical takeoff and landing unmanned aerial vehicle, an arm structure of the existing unmanned aerial vehicle is generally a closed cavity structure, which is not conducive to heat dissipation of the motor and the electronic speed controller. To solve the problem of poor heat dissipation of a motor and an electric speed controller in an arm of an unmanned aerial vehicle, the utility model provides a vertical takeoff and landing unmanned aerial vehicle, which comprises: a left main wing and a right main wing; a left front wing and a right front wing; a main body which is engaged with the left main wing and the right main wing; a left linear support for connecting the left main wing with the left front wing; a right linear support for connecting the right main wing with the right front wing; a first group of multiple lift propellers which are arranged on the left linear support, each lift propeller in the first group of multiple lift propellers having a radius of gyration; a second group of multiple lift propellers which are arranged on the right linear support, each lift propeller in the second group of multiple lift propellers having a radius of gyration, wherein the left linear support and the right linear support each have a hollow interior; wherein a plurality of motors are arranged in the hollow interior of each of the left linear support and the right linear support; at least one air inlet which is provided below at least one lift propeller in the first group of multiple lift propellers and the second group of multiple lift propellers and provided on the top side of each of the left linear support and the right linear support; and at least one air outlet which is provided on each of the left linear support and the right linear support.

The technical solutions of the utility model will be described below in detail in conjunction with specific accompanying drawings.

Figure 1B:
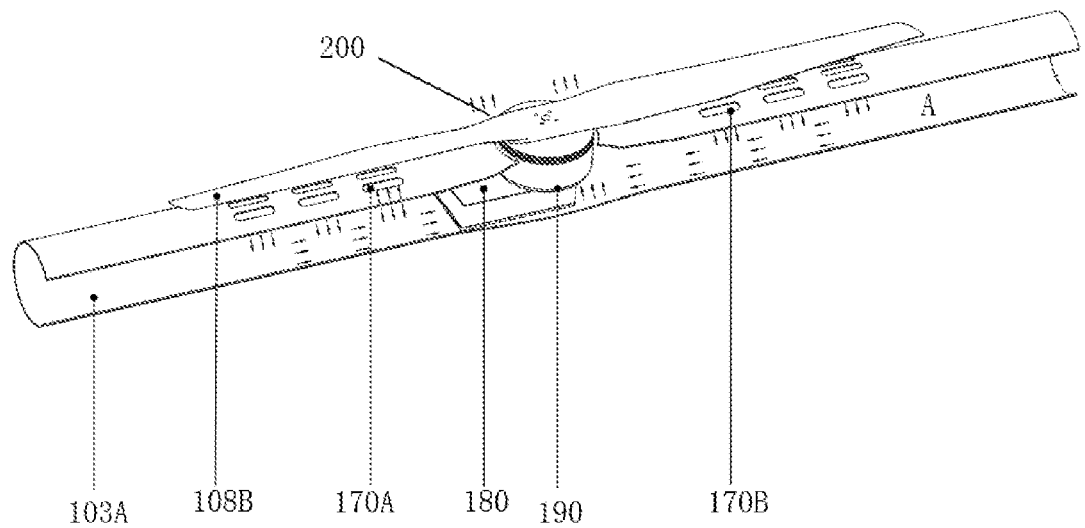
Figure 2:
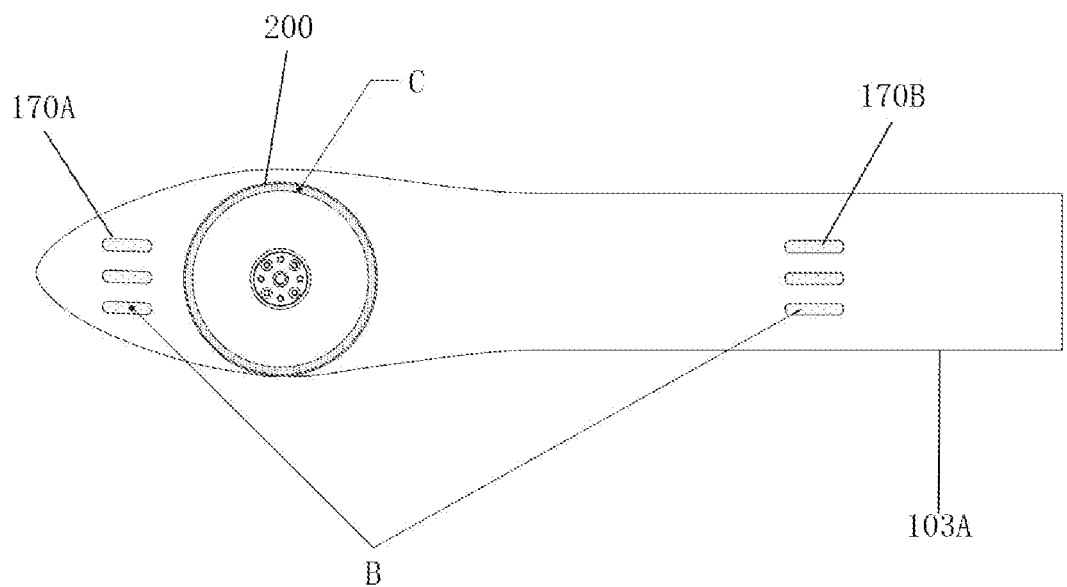
FIG. 2 is another schematic view illustrating an air outlet and air inlets of an unmanned aircraft system in accordance with one aspect of an embodiment.
Figure 3:
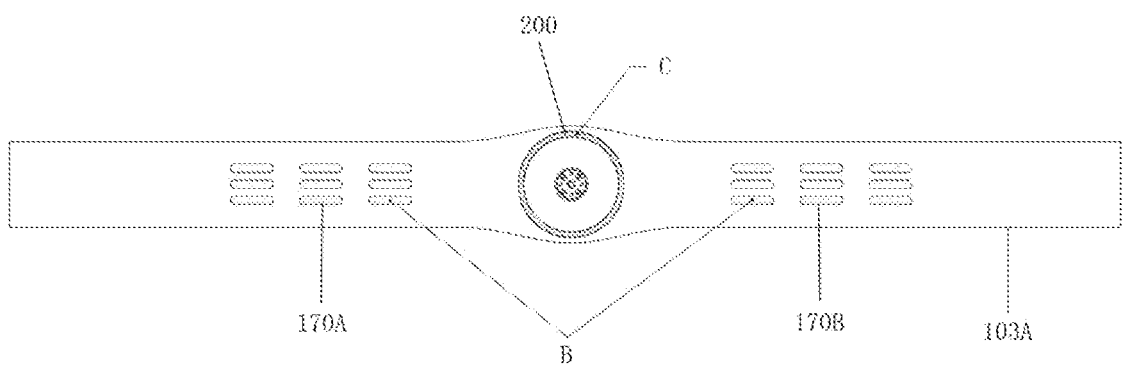
FIG. 3 is still another schematic view illustrating an air outlet and air inlets of the unmanned aircraft system in accordance with one aspect of an embodiment.
Figure 4:
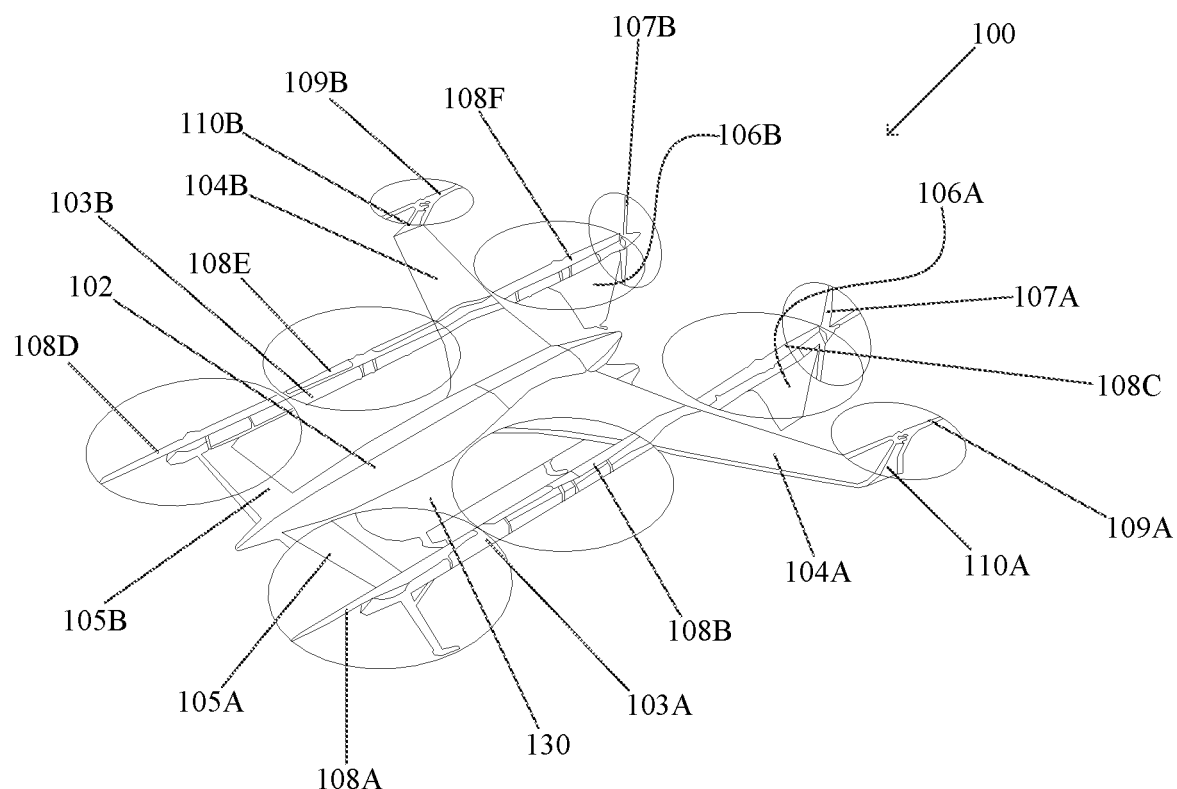
FIG. 4 is a top perspective view of an embodiment of a VTOL unmanned aircraft system with a flight platform and a detachably attached cargo pod in accordance with one aspect of an embodiment.
Figure 5:
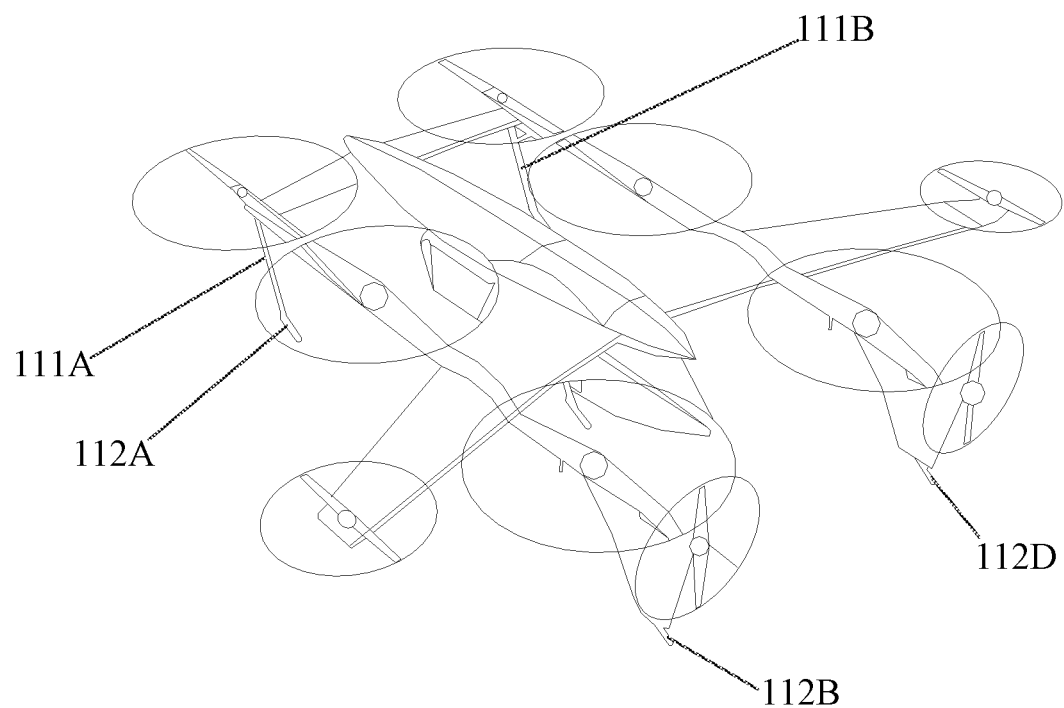
FIG. 5 is a top rear perspective view of the unmanned aircraft system of FIG. 4.
Figure 6:
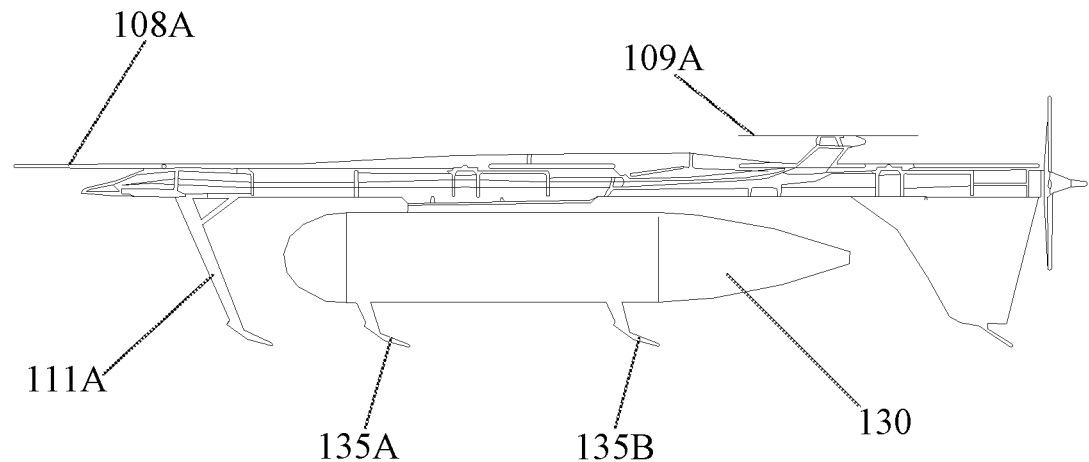
FIG. 6 is a side view of the unmanned aircraft system of FIG. 4.
Figure 7:
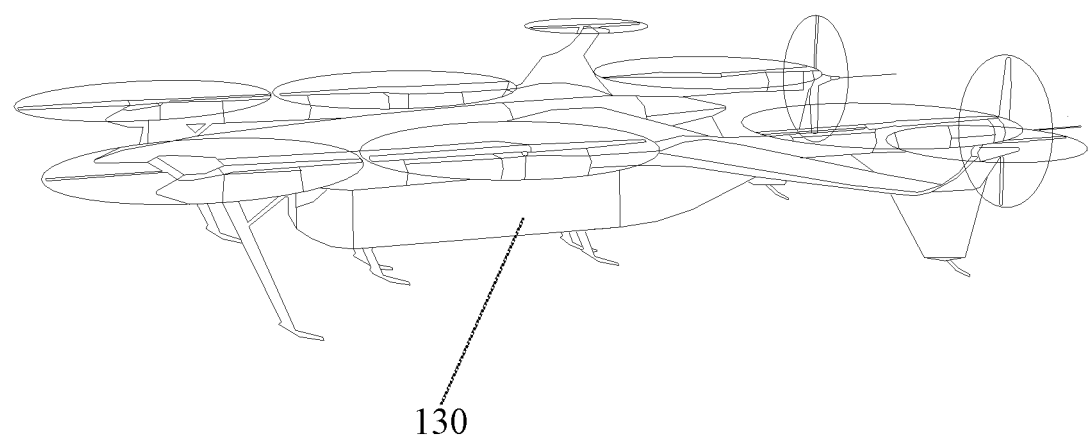
FIG. 7 is a top perspective view of another embodiment of a VTOL unmanned aircraft system with a flight platform and a detachably attached pod in accordance with one aspect of the embodiment.
Figure 8:
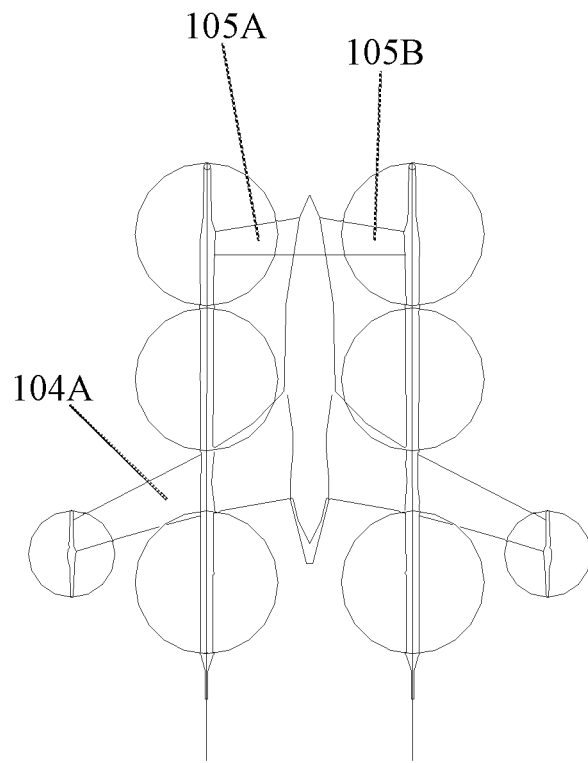
FIG. 8 is a top view of the unmanned aircraft system of FIG. 7 in accordance with one aspect of the embodiment.
Figure 9:
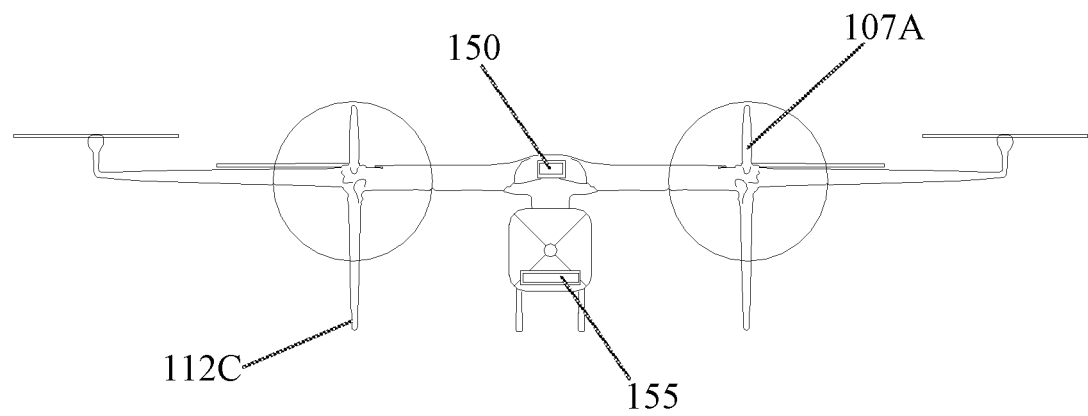
FIG. 9 is a front view of the unmanned aircraft system of FIG. 7 in accordance with one aspect of the embodiment.
Figure 10:
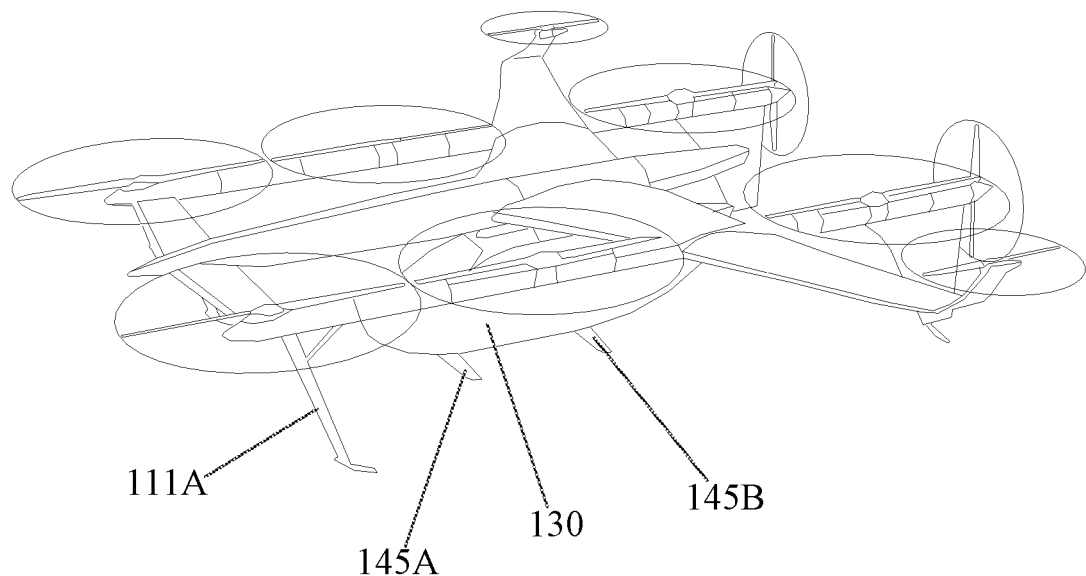
FIG. 10 is a top perspective view of an embodiment of a VTOL unmanned aircraft system with a flight platform and a detachably attached passenger pod in accordance with one aspect of the embodiment.
Figure 11:
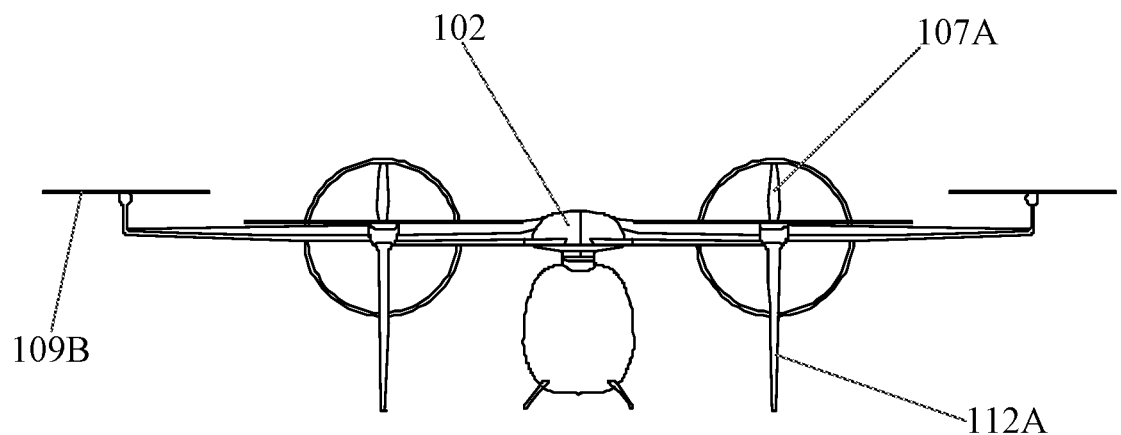
FIG. 11 is a front view of the unmanned aircraft system of FIG. 10 in accordance with one aspect of the embodiment.
Figure 12:
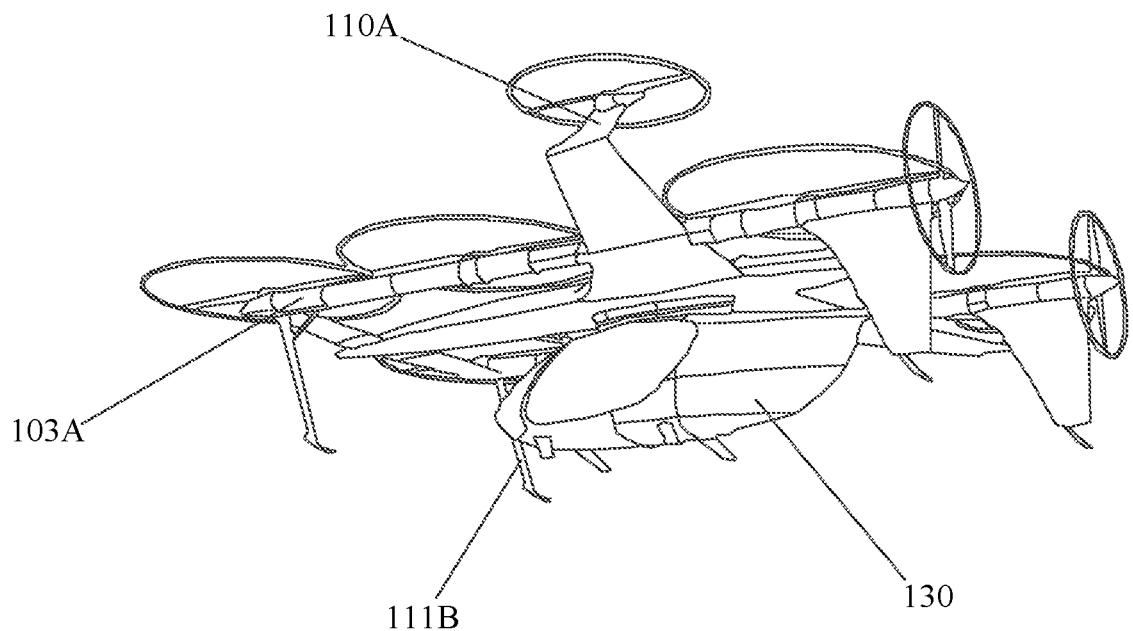
FIG. 12 is a rear perspective view of the unmanned aircraft system of FIG. 10 in accordance with one aspect of the embodiment.
Figure 13:
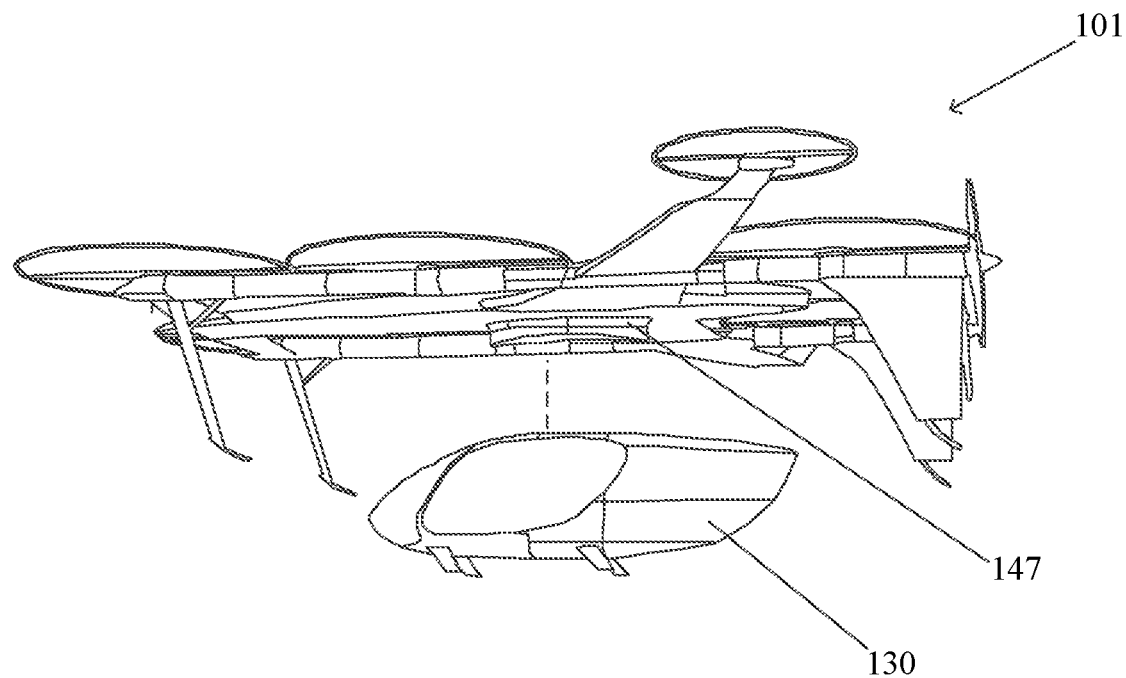
FIG. 13 is a side perspective view of the unmanned aircraft system of FIG. 10 in accordance with one aspect of the embodiment, wherein the passenger pod is detached from the flight platform and parked on the ground.
Figure 14:
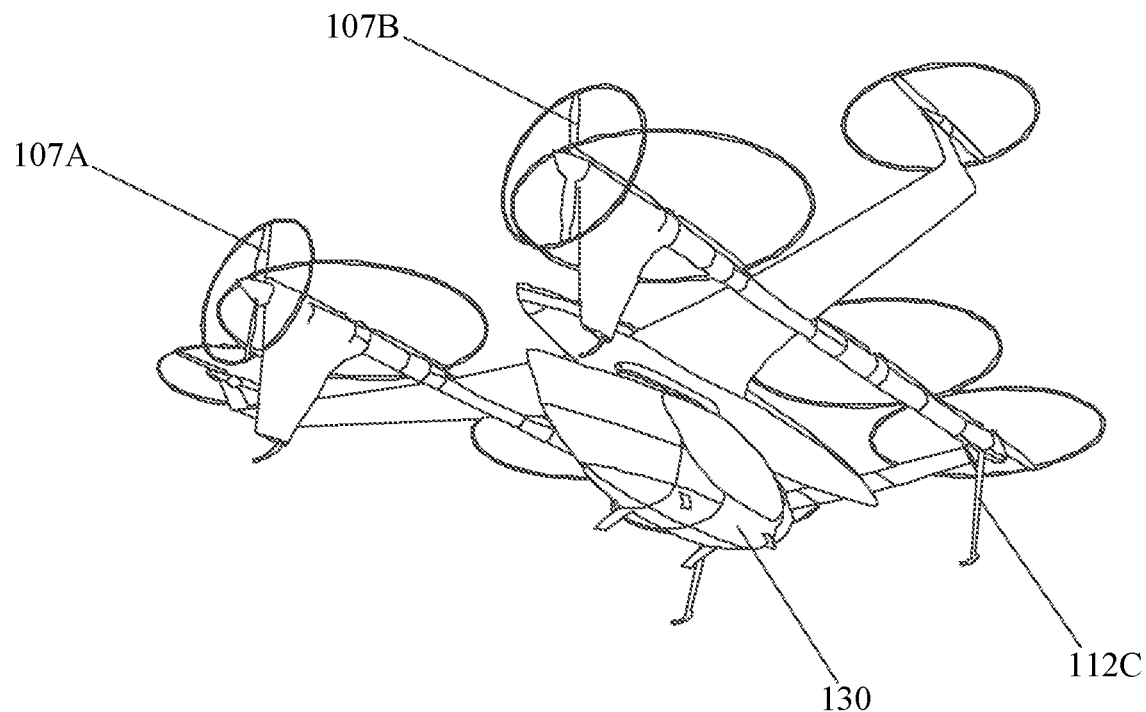
FIG. 14 is a rear perspective view of the embodiment of FIG. 10 in accordance with one aspect of the embodiment.
Figure 15:
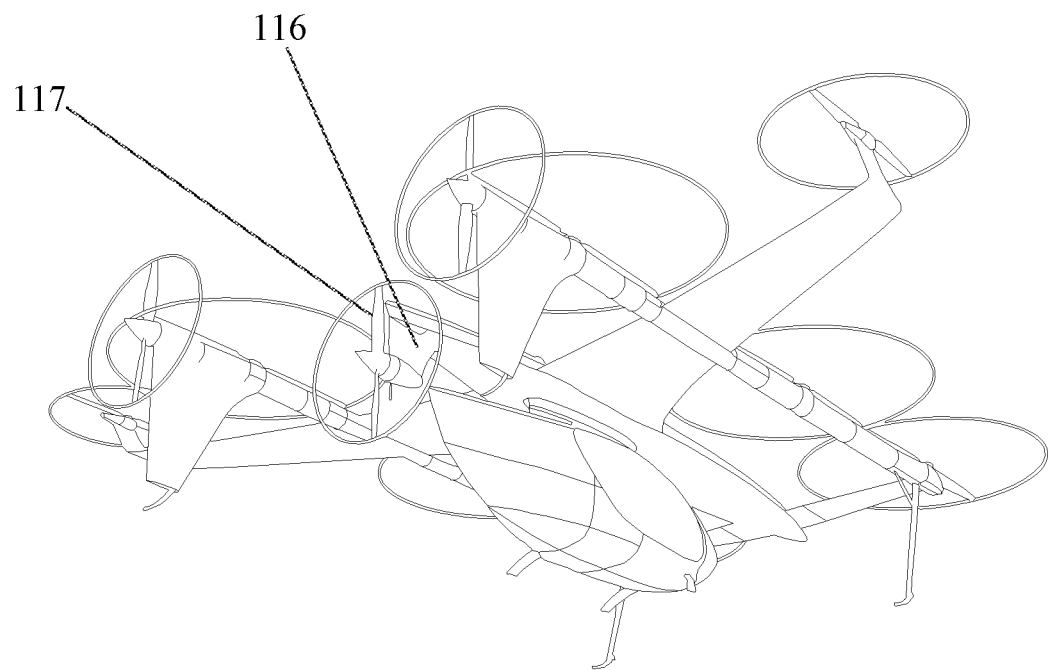
FIG. 15 is a rear perspective view of another embodiment in accordance with one aspect of the utility model.
Figure 16:
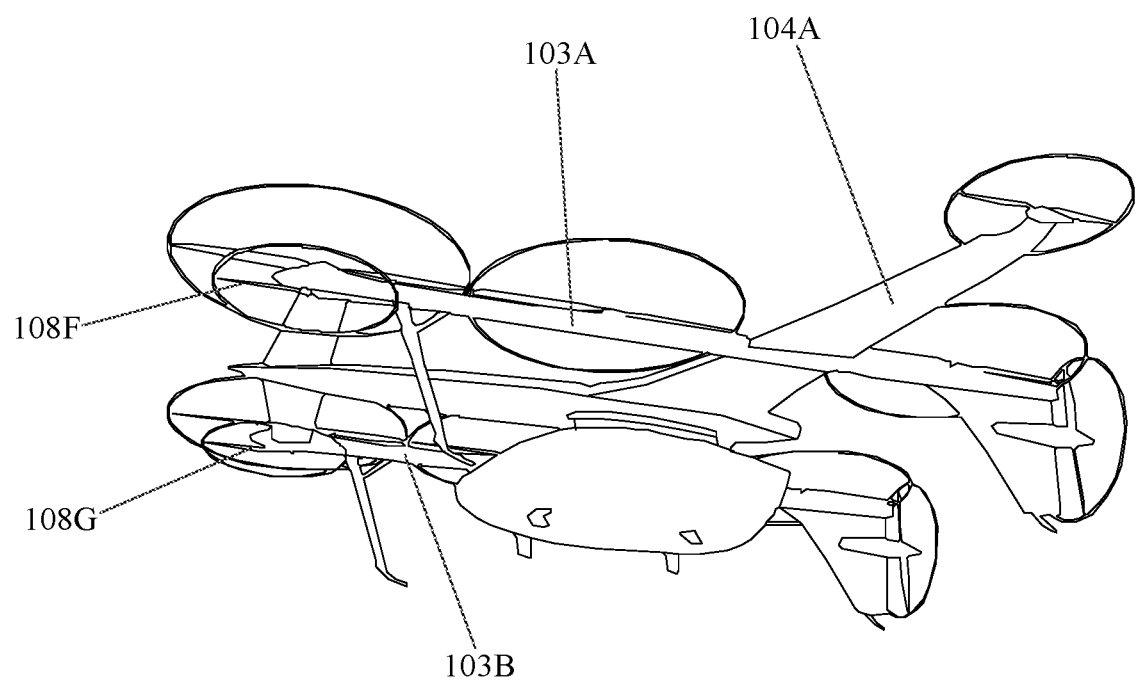
FIG. 16 is a side bottom perspective view of still another embodiment of an unmanned aircraft system in accordance with one aspect of the embodiment.
Figure 17:
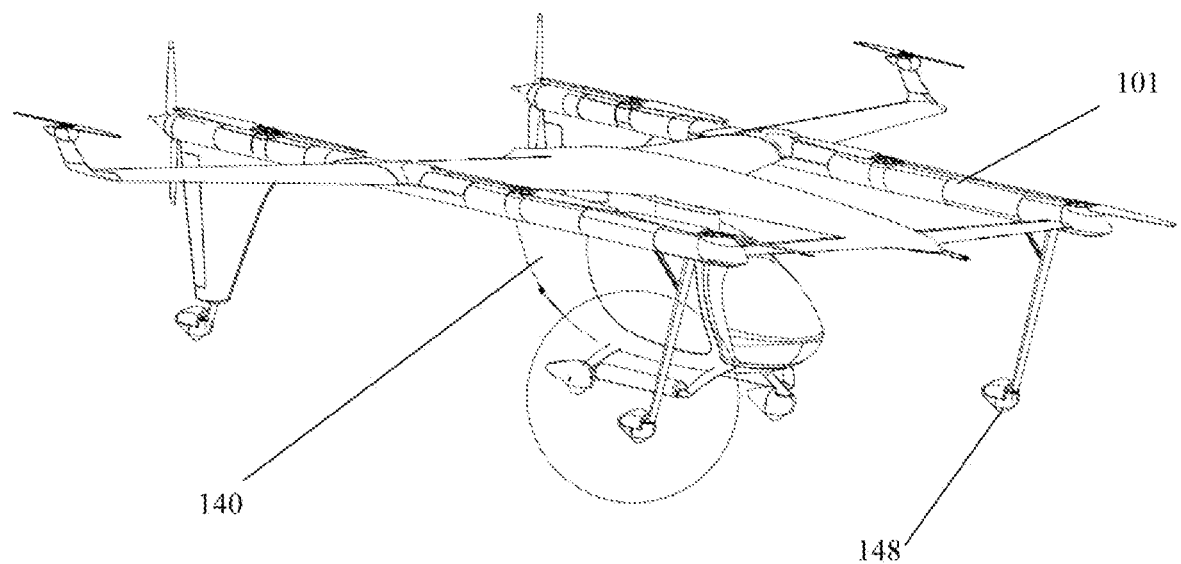
FIG. 17 is a perspective view of one embodiment of an unmanned aircraft system in accordance with another aspect of the embodiment.
Figure 18:
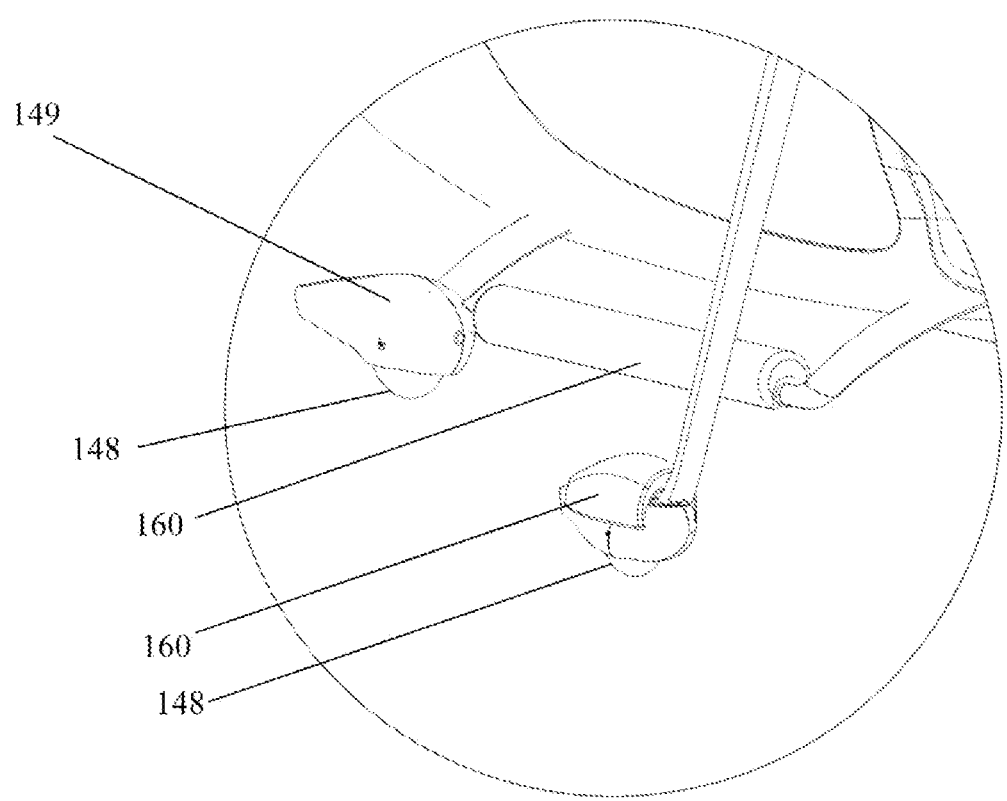
FIG. 18 is a close-up view of an encircled region in FIG. 17 in accordance with another aspect of the embodiment.
Figure 19:
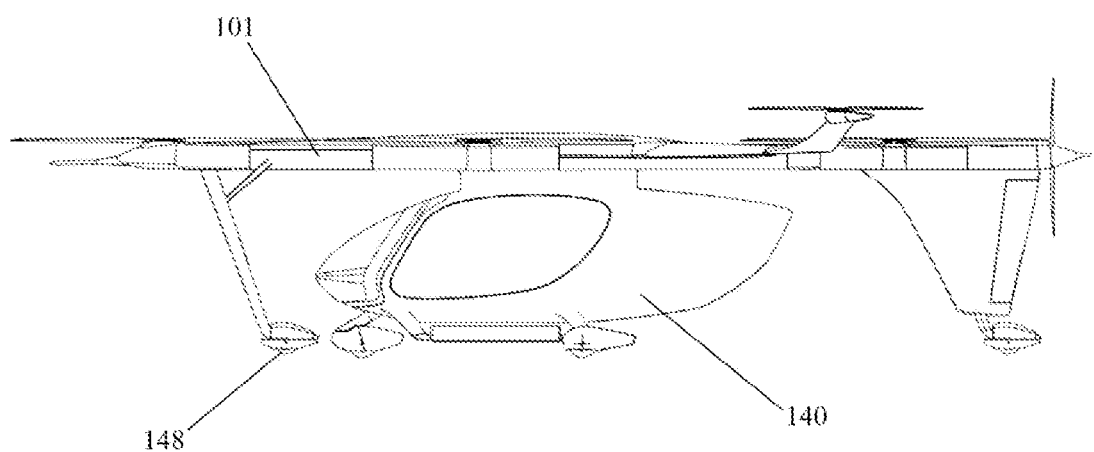
FIG. 19 is a side view of one embodiment of an unmanned aircraft system in accordance with another aspect of the embodiment.
Figure 20:
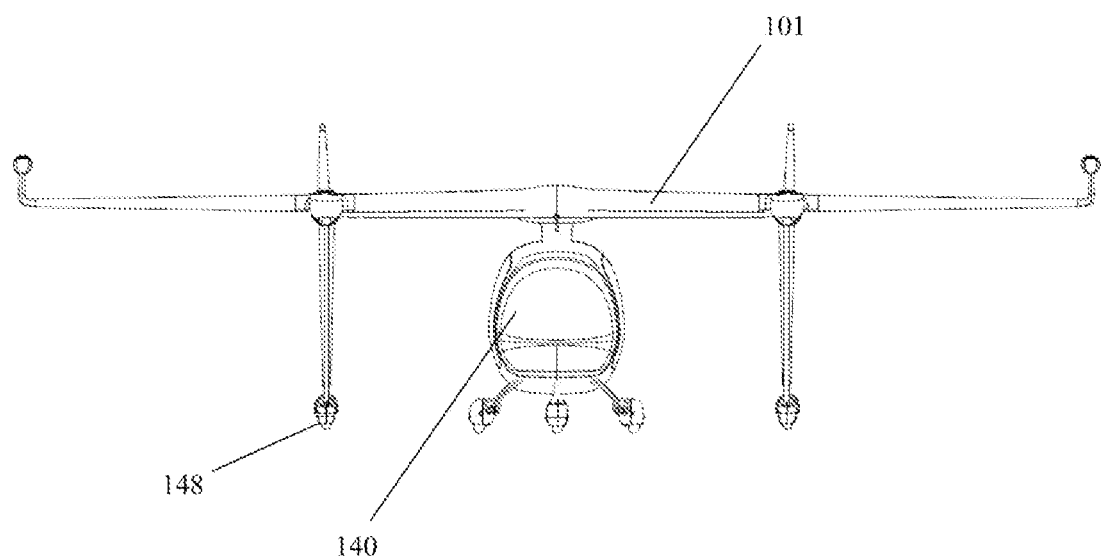
FIG. 20 is a front view of one embodiment of an unmanned aircraft system in accordance with another aspect of the embodiment.
Figure 21:
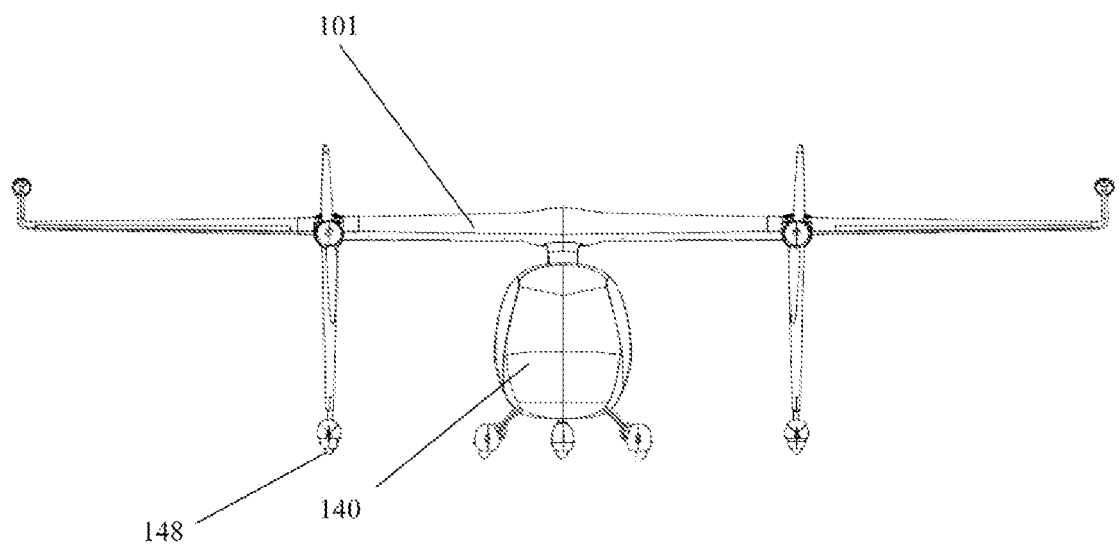
FIG. 21 is a rear view of one embodiment of an unmanned aircraft system in accordance with another aspect of the embodiment.
Figure 22:
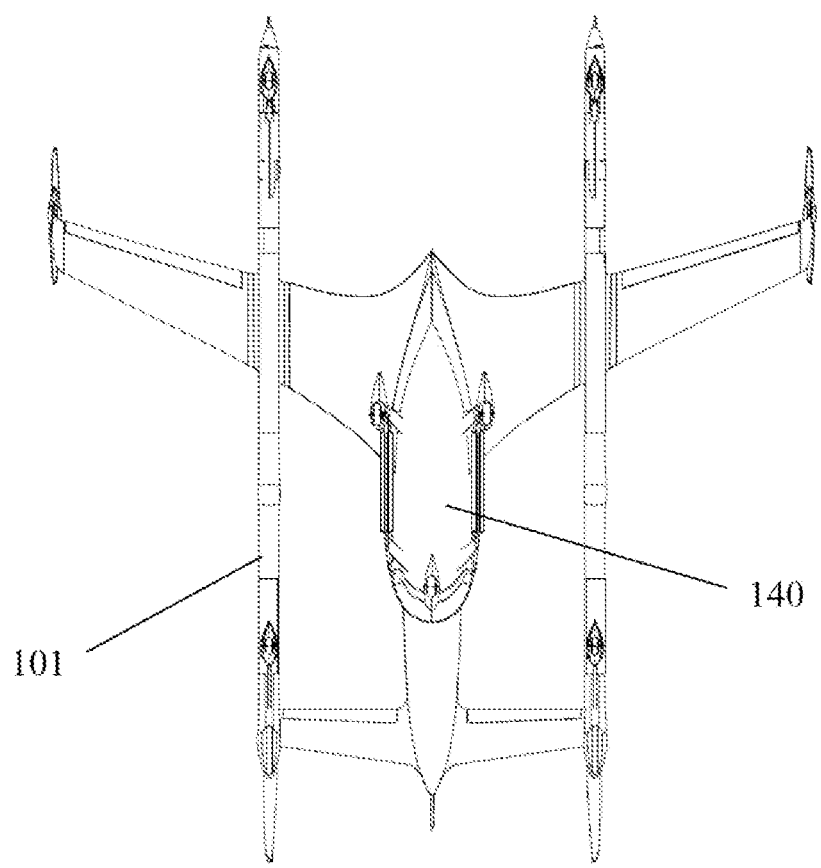
FIG. 22 is an upward view of one embodiment of an unmanned aircraft system in accordance with another aspect of the embodiment.
Figure 23:
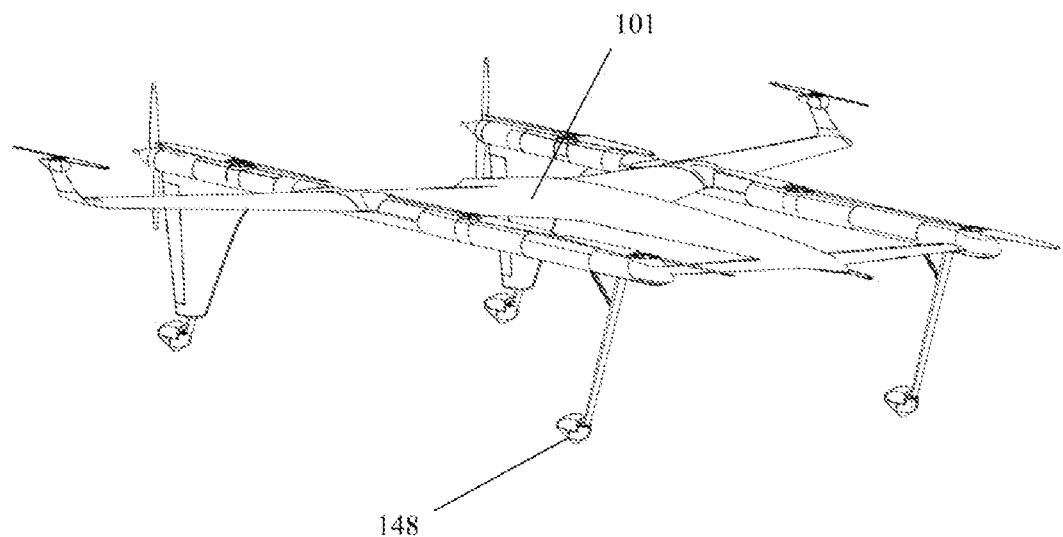
FIG. 23 is a perspective view of another embodiment of a flight platform in accordance with another aspect of the embodiment.
Figure 24:
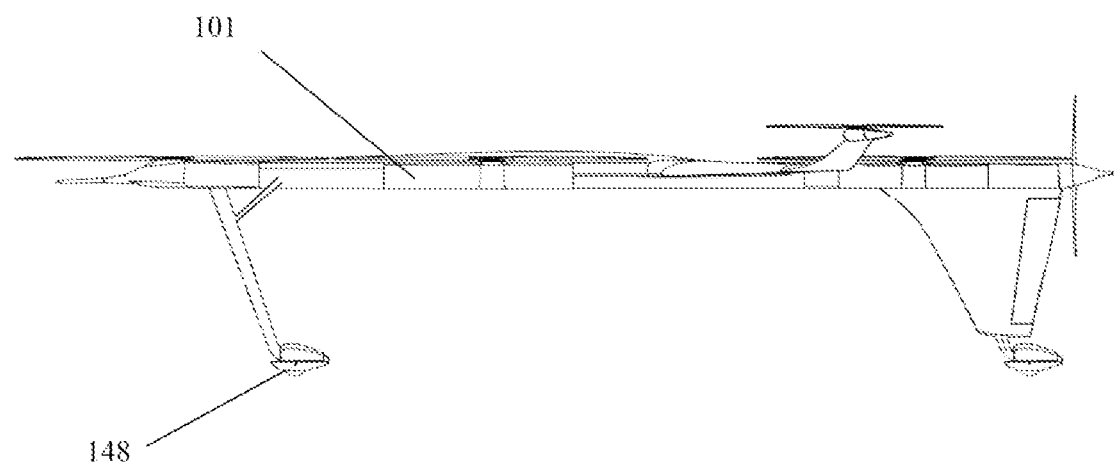
FIG. 24 is a side view of another embodiment of a flight platform in accordance with another aspect of the embodiment.
Figure 25:
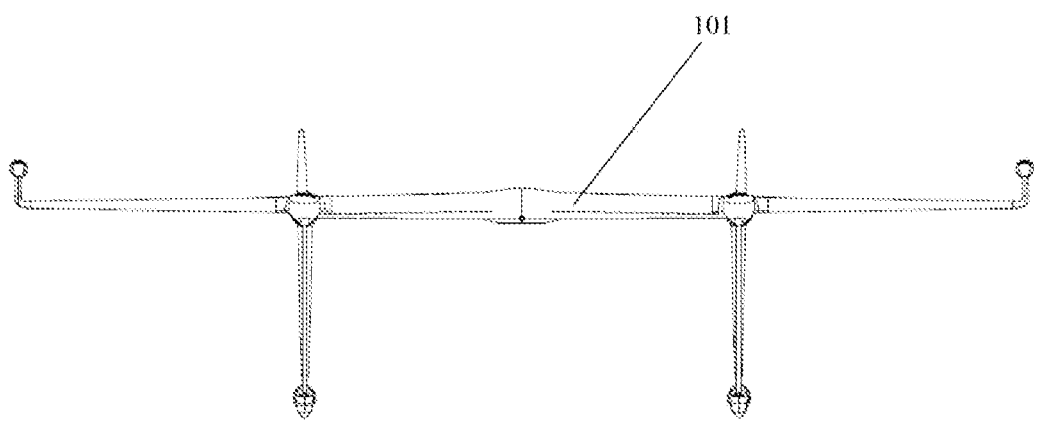
FIG. 25 is a front view of another embodiment of a flight platform in accordance with another aspect of the embodiment.
Figure 26:
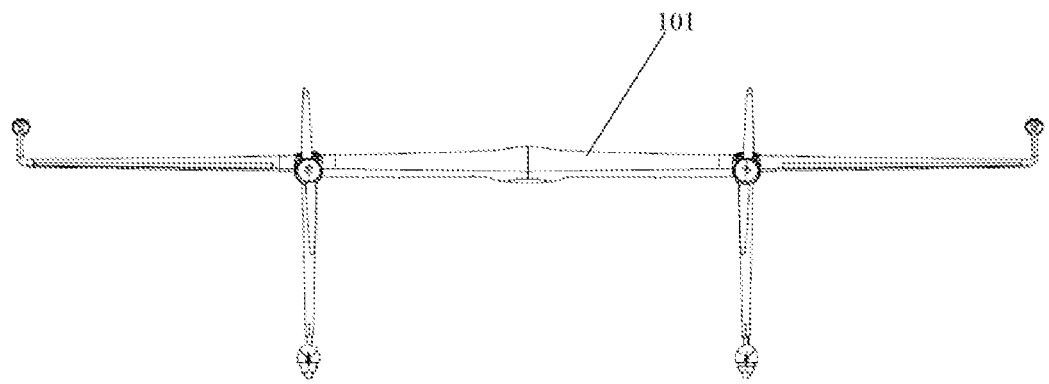
FIG. 26 is a rear view of another embodiment of a flight platform in accordance with another aspect of the embodiment.
Figure 27:
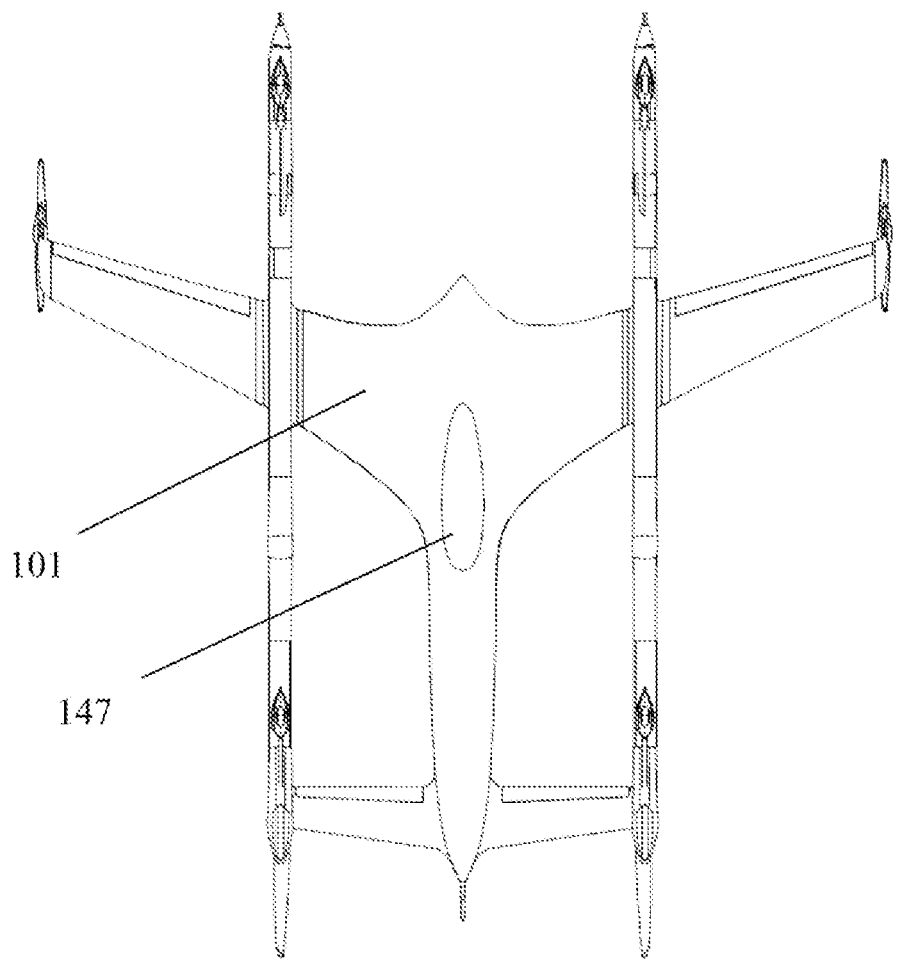
FIG. 27 is an upward view of another embodiment of a flight platform in accordance with another aspect of the embodiment.
Figure 28:
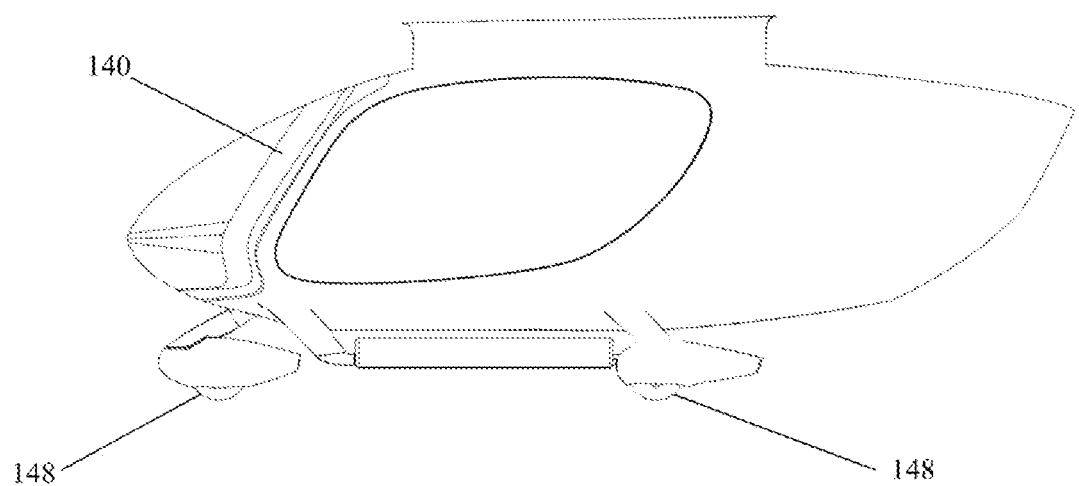
FIG. 28 is a side view of another embodiment of a passenger pod in accordance with another aspect of the embodiment.
Figure 29:
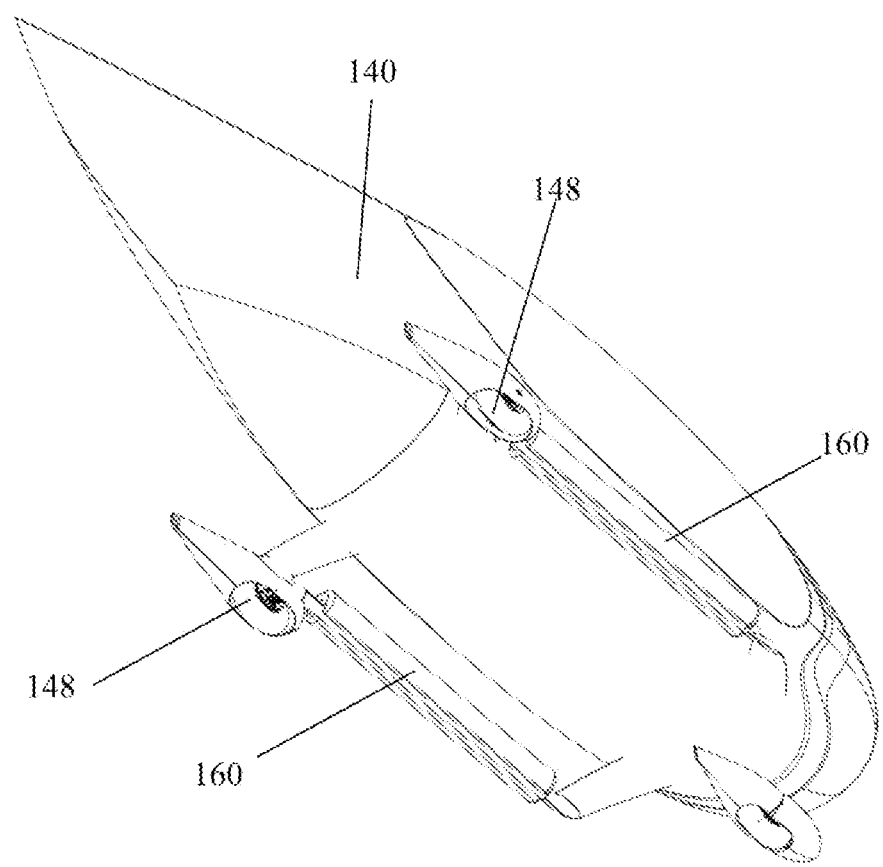
FIG. 29 is a bottom perspective view of another embodiment of a passenger pod in accordance with another aspect of the embodiment.
Figure 30:
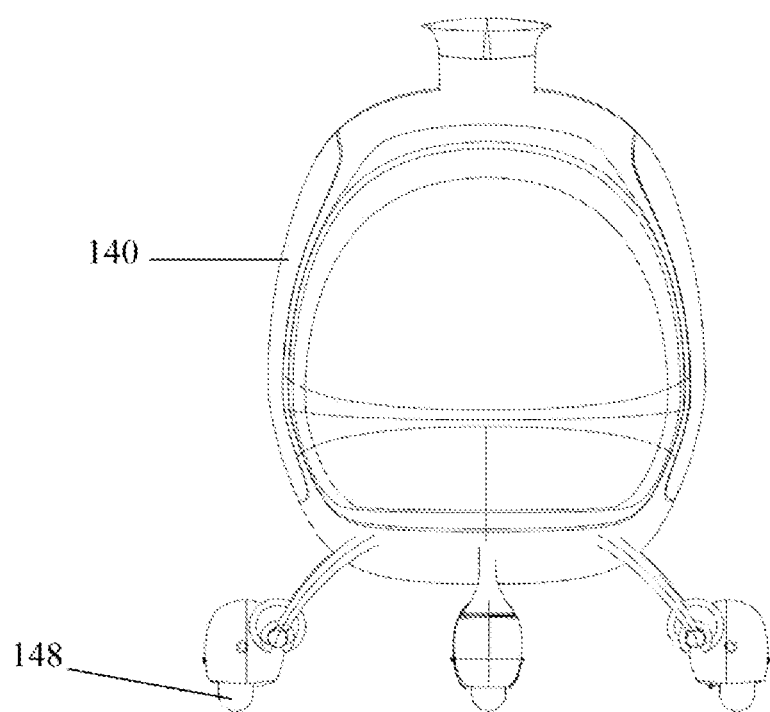
FIG. 30 is a front view of another embodiment of a passenger pod in accordance with another aspect of the embodiment.
Figure 31:
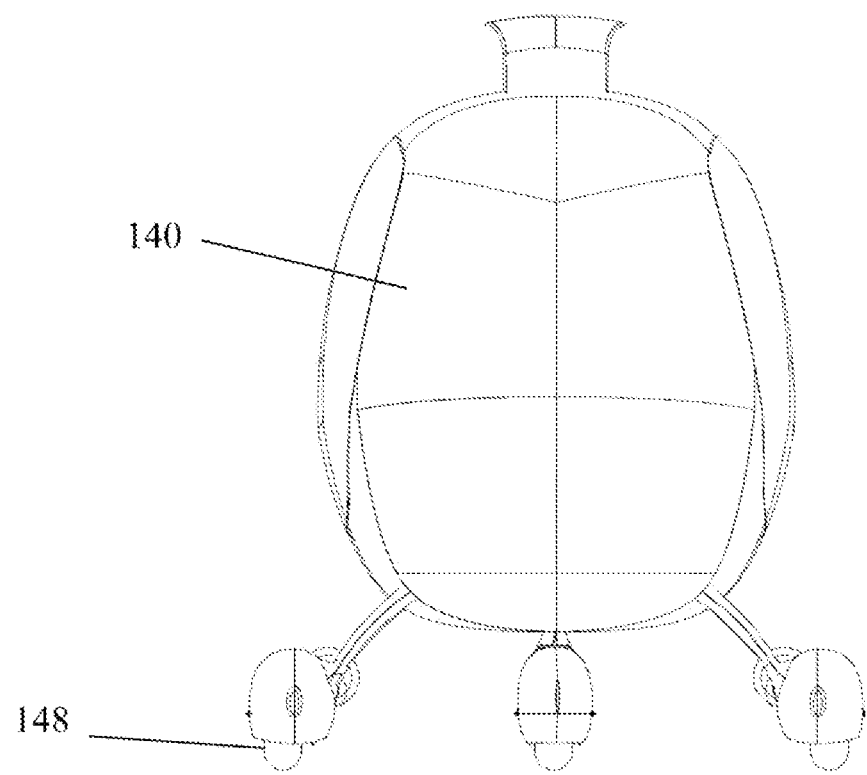
FIG. 31 is a rear view of another embodiment of a passenger pod in accordance with another aspect of the embodiment.
Figure 32:
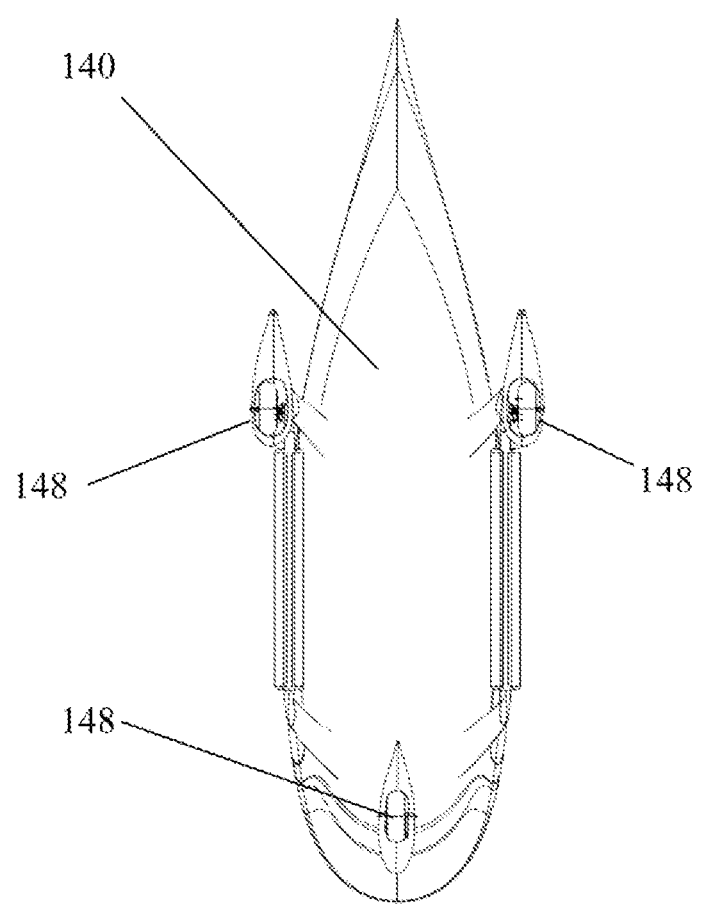
FIG. 32 is an upward view of another embodiment of a passenger pod in accordance with another aspect of the embodiment.
Figure 33:
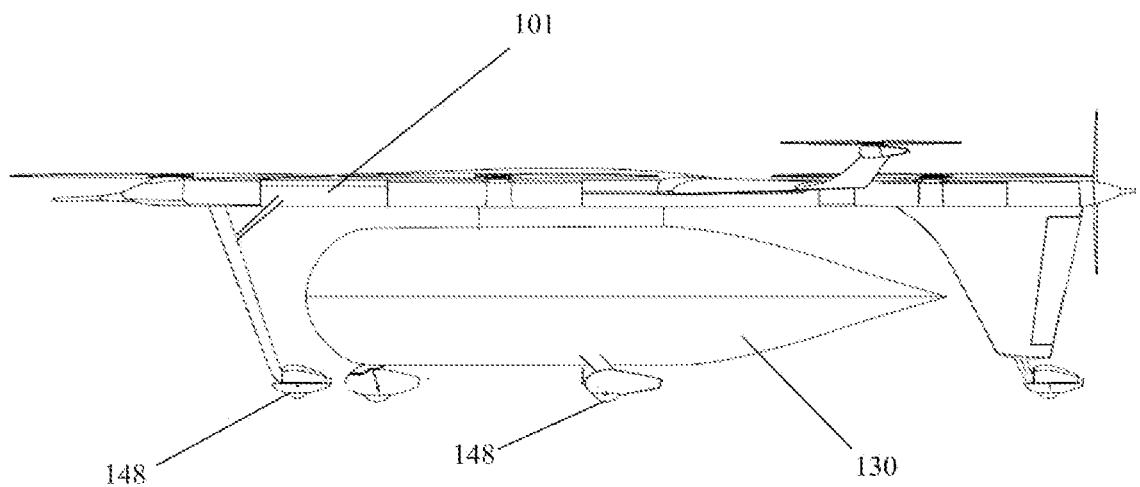
FIG. 33 is a side view of another embodiment of a flight platform attached to a cargo pod in accordance with another aspect of the embodiment.
Figure 34:
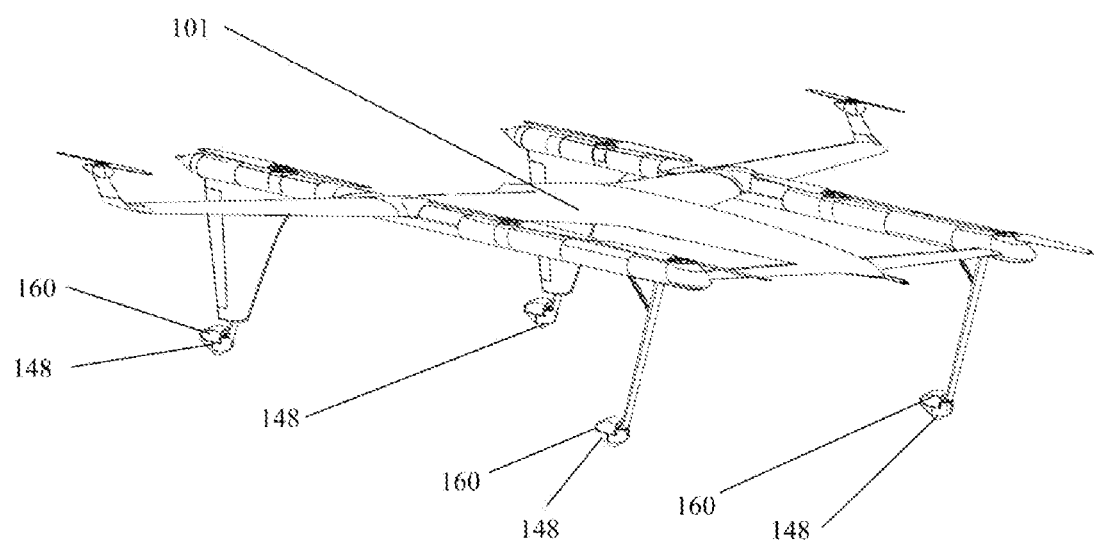
FIG. 34 is a perspective view of another embodiment of a flight platform without a propulsion propeller in accordance with another aspect of the embodiment.
Figure 35:
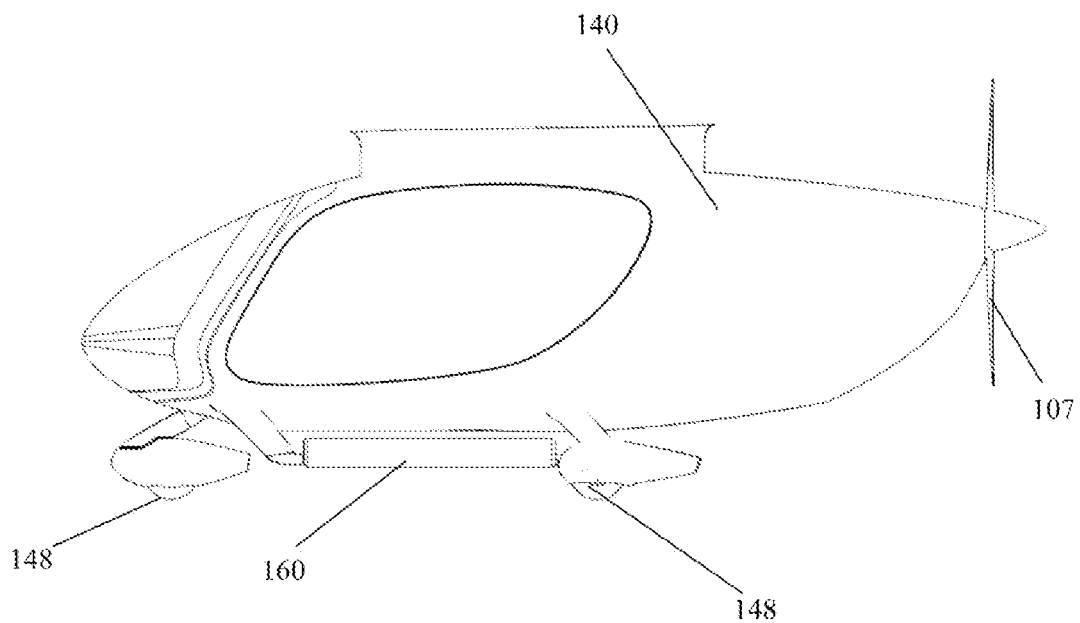
FIG. 35 is a side view of another embodiment of a passenger pod with a propulsion propeller in accordance with another aspect of the embodiment.
Figure 36:
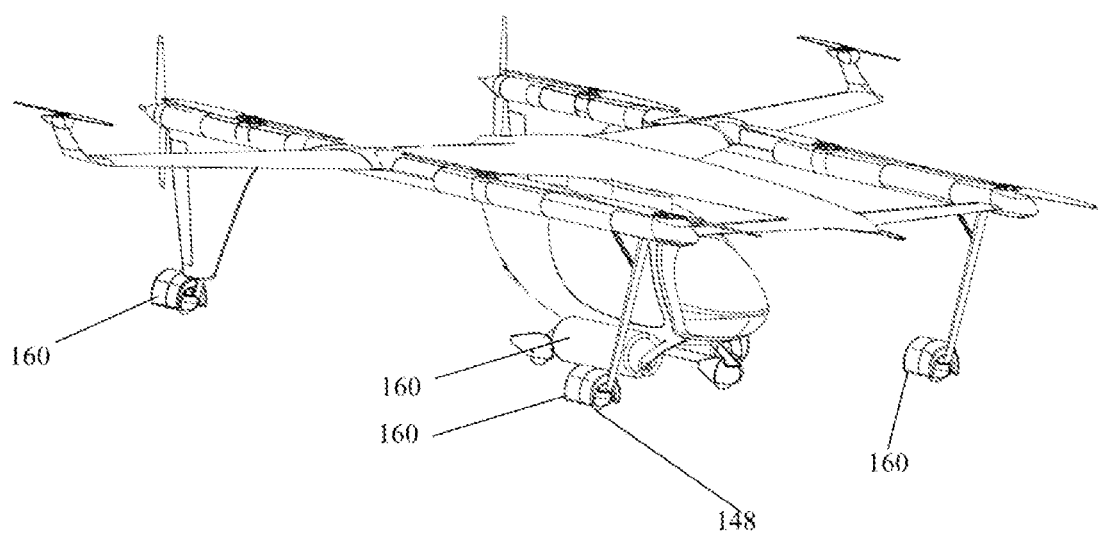
FIG. 36 is a perspective view of still another embodiment of a flight unmanned aircraft system, wherein six flotation devices are inflated.
Figure 37:
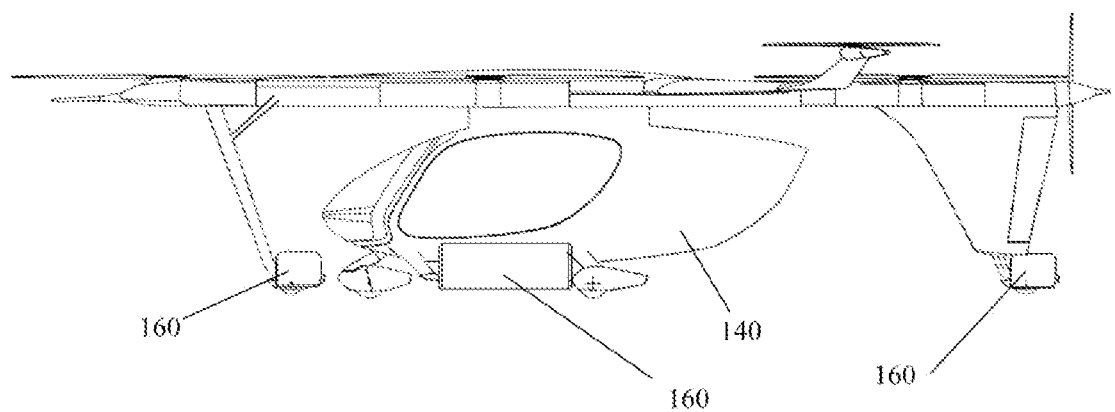
FIG. 37 is a side view of the aerial vehicle of FIG. 36.
Figure 38:
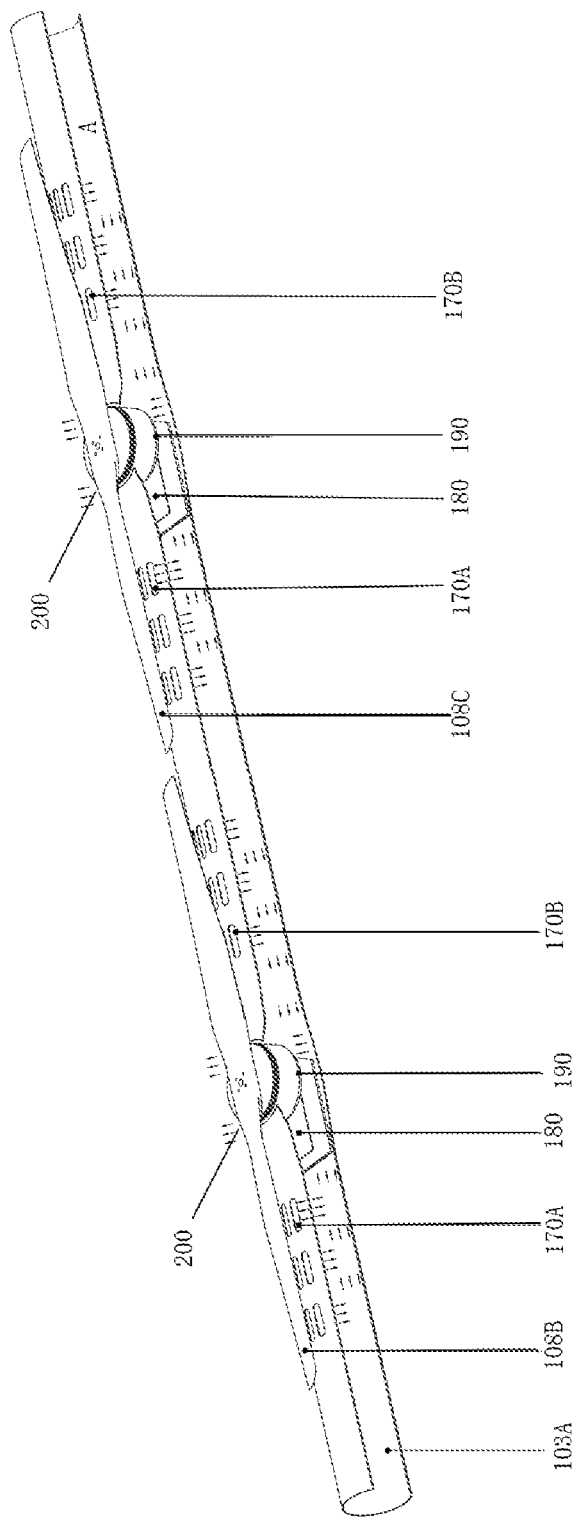
FIG. 38 is a schematic view of a cooling system for an unmanned aerial vehicle in accordance with one embodiment of one aspect of the utility model.
Figure 39:
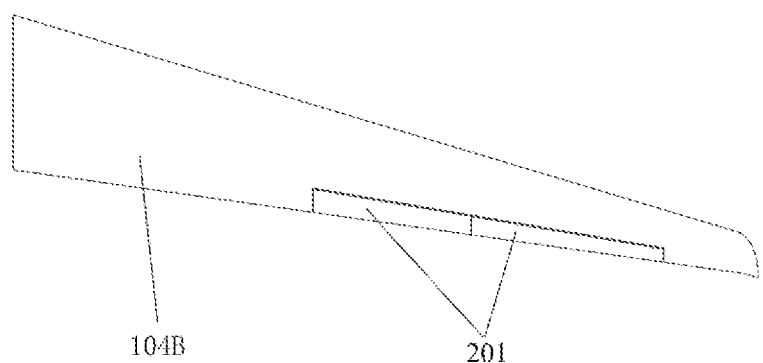
FIG. 39 is a view illustrating a configuration of ailerons of an unmanned aerial vehicle.

FIG. 1*a* is a top perspective view of an embodiment of a VTOL (vertical takeoff and landing) unmanned aircraft system in accordance with one aspect of an embodiment; FIG. 1*b* is a partial schematic view of an air outlet and air inlets of the unmanned aircraft system illustrated in FIG. 1*a*; FIG. 2 is another schematic view illustrating an air outlet and air inlets of the unmanned aircraft system in accordance with one aspect of an embodiment; FIG. 3 is still another schematic view illustrating an air outlet and air inlets of the unmanned aircraft system in accordance with one aspect of an embodiment; FIG. 4 is a top perspective view of an embodiment of a VTOL unmanned aircraft system with a flight platform and a detachably attached cargo pod in accordance with one aspect of an embodiment; FIG. 5 is a top rear perspective view of the unmanned aircraft system of FIG. 4; FIG. 6 is a side view of the unmanned aircraft system of FIG. 4; FIG. 7 is a top perspective view of another embodiment of a VTOL unmanned aircraft system with a flight platform and a detachably attached pod in accordance with one aspect of the embodiment; FIG. 8 is a top view of the unmanned aircraft system of FIG. 7 in accordance with one aspect of the embodiment; FIG. 9 is a front view of the unmanned aircraft system of FIG. 7 in accordance with one aspect of the embodiment; FIG. 10 is a top perspective view of an embodiment of a VTOL unmanned aircraft system with a flight platform and a detachably attached passenger pod in accordance with one aspect of the embodiment; FIG. 11 is a front view of the unmanned aircraft system of FIG. 10 in accordance with one aspect of the embodiment; FIG. 12 is a rear perspective view of the unmanned aircraft system of FIG. 10 in accordance with one aspect of the embodiment; FIG. 13 is a side perspective view of the unmanned aircraft system of FIG. 10 in accordance with one aspect of the embodiment, wherein the passenger pod is detached from the flight platform and parked on the ground; FIG. 14 is a rear perspective view of the embodiment of FIG. 10 in accordance with one aspect of the embodiment; FIG. 15 is a rear perspective view of another embodiment in accordance with one aspect of the utility model; FIG. 16 is a side bottom perspective view of still another embodiment of an unmanned aircraft system in accordance with one aspect of the embodiment; FIG. 17 is a perspective view of one embodiment of an unmanned aircraft system in accordance with another aspect of the embodiment; FIG. 18 is a close-up view of an encircled region in FIG. 17 in accordance with another aspect of the embodiment; FIG. 19 is a side view of one embodiment of an unmanned aircraft system in accordance with another aspect of the embodiment; FIG. 20 is a front view of one embodiment of an unmanned aircraft system in accordance with another aspect of the embodiment; FIG. 21 is a rear view of one embodiment of an unmanned aircraft system in accordance with another aspect of the embodiment; FIG. 22 is an upward view of one embodiment of an unmanned aircraft system in accordance with another aspect of the embodiment; FIG. 23 is a perspective view of another embodiment of a flight platform in accordance with another aspect of the embodiment; FIG. 24 is a side view of another embodiment of a flight platform in accordance with another aspect of the embodiment; FIG. 25 is a front view of another embodiment of a flight platform in accordance with another aspect of the embodiment; FIG. 26 is a rear view of another embodiment of a flight platform in accordance with another aspect of the embodiment; FIG. 27 is an upward view of another embodiment of a flight platform in accordance with another aspect of the embodiment; FIG. 28 is a side view of another embodiment of a passenger pod in accordance with another aspect of the embodiment; FIG. 29 is a bottom perspective view of another embodiment of a passenger pod in accordance with another aspect of the embodiment; FIG. 30 is a front view of another embodiment of a passenger pod in accordance with another aspect of the embodiment; FIG. 31 is a rear view of another embodiment of a passenger pod in accordance with another aspect of the embodiment; FIG. 32 is an upward view of another embodiment of a passenger pod in accordance with another aspect of the embodiment; FIG. 33 is a side view of another embodiment of a flight platform attached to a cargo pod in accordance with another aspect of the embodiment; FIG. 34 is a perspective view of another embodiment of a flight platform without a propulsion propeller in accordance with another aspect of the embodiment; FIG. 35 is a side view of another embodiment of a passenger pod with a propulsion propeller in accordance with another aspect of the embodiment; FIG. 36 is a perspective view of still another embodiment of a flight unmanned aircraft system, wherein six flotation devices are inflated; FIG. 37 is a side view of the flight unmanned aerial vehicle of FIG. 36; FIG. 38 is a schematic view of a cooling system for an unmanned aerial vehicle in accordance with one embodiment of one aspect of the utility model; FIG. 39 is a view illustrating a configuration of ailerons of an unmanned aerial vehicle.

FIG. 1*a* is a top perspective view of an embodiment of a VTOL unmanned aircraft system in accordance with one aspect of an embodiment. FIG. 1*b* is a partial schematic view of an air outlet and air inlets of the unmanned aircraft system illustrated in FIG. 1a. FIG. 2 is another schematic view illustrating an air outlet and air inlets of an unmanned aircraft system in accordance with one aspect of an embodiment. FIG. 3 is still another schematic view illustrating an air outlet and air inlets of an unmanned aircraft system in accordance with one aspect of an embodiment. The unmanned aerial vehicle 100 at least comprises: a left main wing 104A and a right main wing 104B; a left front wing 105A and a right front wing 105B; a main body 102 which is engaged with the left main wing 104A and the right main wing 104B; a left linear support 103A for connecting the left main wing 104A with the left front wing 105A; a right linear support 103B for connecting the right main wing 104B with the right front wing 105B; a first group of multiple lift propellers 108A, 108B, 108C which are arranged on the left linear support 103A, each lift propeller in the first group of multiple lift propellers having a radius of gyration; a second group of multiple lift propellers 108D, 108E, 108F which are arranged on the right linear support 103B, each lift propeller in the second group of multiple lift propellers having a radius of gyration, wherein the left linear support 103A and the right linear support 103B each have a hollow interior; wherein a plurality of motors (not shown) are arranged in the hollow interior of each of the left linear support 103A and the right linear support 103B; at least one air inlet 170A and 108B which is provided below at least one lift propeller in the first group of multiple lift propellers 108A, 108B, 108C and the second group of multiple lift propellers 108D, 108E, 108F and provided on the top side of each of the left linear support 103A and the right linear support 103B; and at least one air outlet 200 which is provided on each of the left linear support 103A and the right linear support 103B.

By adopting an unmanned aerial vehicle of the utility model, through a mode of forming holes in the upper side of a lift motor arm, the holes are located in front of and behind an installation position of the lift motor respectively, and then airflow generated by rotation of a propeller in the vertical takeoff and landing stage of the unmanned aerial vehicle is utilized to enable downward-pressing airflow generated by the propeller to accelerate air motion around the hole area, and to form convection between an original closed inner cavity structure of the vertical take-off and landing unmanned aerial vehicle and the atmospheric environment, thereby generating a rapid-flowing spatial flow field, which is in favor of diffusing heat, generated by the lift motor and an electronic speed controller, of the vertical takeoff and landing unmanned aerial vehicle into the air more quickly, and the purpose of efficient heat dissipation of the motor and the electronic speed controller in the arm may be achieved; and in the vertical takeoff and landing unmanned aerial vehicle provided by the utility, the takeoff weight of the unmanned aerial vehicle cannot be increased, power consumption of airborne equipment cannot be increased, and interior spaces of the arms cannot be occupied.

Preferably, the two ends of the left linear support 103A are formed as a tapered structure, and apex of the tapered structure is located on the axis of the left linear support 103A. Correspondingly, the two ends of the right linear support 103B are formed as a tapered structure, and apex of the tapered structure is located on the axis of the right linear support 103B. It may be understood by those skilled in the art that resistance of air to the left linear support 103A and the right linear support 103B in the flight process of the unmanned aerial vehicle 100 may be reduced by forming two ends of each of the left linear support 103A and the right linear support 103B as the tapered structure, and thus the cruising ability of the unmanned aerial vehicle 100 is improved.

FIG. 4 depicts an embodiment of a VTOL unmanned aerial vehicle 100 with a front wing configuration in general.

The various part features of the unmanned aerial vehicle 100 in the various embodiments shown in the accompanying drawings, which are illustrative only, may be flexibly combined to form an unmanned aerial vehicle with a new structure.

The unmanned aerial vehicle 100 in FIG. 4 may have two main wings 104A, 104B as a left main wing and a right main wing, and two front wings as a left front wing 105A and a right front wing 105B. The two main wings 104A, 104B and the two front wings 105A, 105B may be attached to a main body 102, wherein the main body may be positioned along a central longitudinal line of the unmanned aerial vehicle 100. The unmanned aerial vehicle 100 may also have a left linear support 103A arranged parallel to the main body 102, which may connect the left main wing 104A to the left front wing 105A. Similarly, the unmanned aerial vehicle 100 may also have a right linear support 103B arranged parallel to the main body 102, which may connect the right main wing 104B to the right front wing 105B. Wherein the front wings of the unmanned aerial vehicle mainly control a flight attitude of the unmanned aerial vehicle during the flight period, such as controlling the pitch of the unmanned aerial vehicle. The main wings of the unmanned aerial vehicle, acting as the largest wings at two sides of a fuselage, are usually used for generating lift to support the unmanned aerial vehicle to fly in the air, and meanwhile, certain stabilization and manipulation effects are achieved.

In one embodiment, the unmanned aerial vehicle 100 may not have the front wing configuration. Illustratively, the unmanned aerial vehicle 100 may have two main wings as a left main wing and a right main wing, and two ailerons as a left aileron and a right aileron, all of which are engaged together to form a flight platform. In the following description, the description of the front wing and the aileron is not distinguished unless specifically stated. The main wing and the aileron may be configured as a front wing configuration.

In one embodiment, as shown in FIG. 39, the ailerons 201 of the unmanned aerial vehicle may be arranged at a rear side of the main wing 104B, there may be at least one aileron, preferably two, which is in a sheet-like configuration, and capable of moving up and down to control the roll of the unmanned aerial vehicle.

The left linear support 103A and the right linear support 103B are expected to improve the structural integrity of the unmanned aerial vehicle 100. In other embodiments, the left linear support 103A and the right linear support 103B may accommodate a driving motor (not shown) for driving each of the lift propellers 108A, 108B, 108C, 108D, 108E, and 108F. Thus, the left linear support 103A and the right linear support 103B may be used for fixing the lift propellers to reduce usage of the parts of the unmanned aerial vehicle, and while simplifying structural parts of the unmanned aerial vehicle, the overall strength of the unmanned aerial vehicle may be improved due to the engagement of the left linear support 103A and the right linear support 103B with the two front wings and the two main wings. As will be disclosed later, the left linear support 103 A and the right linear support 103B may also accommodate folding legs 111, each of which may be retracted into the left linear support 103 A and the right linear support 103B.

In one embodiment, the left linear support 103A and the right linear support 103B are attached to the distal ends of the left front wing 105A and the right front wing 105B respectively. In still another embodiment, the left linear support 103A and the right linear support 103B extend beyond the front wings 105A, 105B.

In one embodiment, the left linear support 103A and the right linear support 103B are attached to positions near the middle portions of the left main wing 104A and the right main wing 104B respectively. In still another embodiment, the left linear support 103A and the right linear support 103B extend beyond the main wings 104A, 104B along a backwards direction.

The left linear support 103A is expected to be relative narrow in diameter, and may have a first group of multiple lift propellers 108A, 108B, 108C arranged at the top side, the bottom side, or both, of the left linear support 103A. The first group of multiple lift propellers 108A, 108B, 108C may each have a radius of gyration. In one feasible embodiment, these lift propellers 108A, 108B, 108C may be driven by low profile motors arranged in a hollow interior of the left linear support 103A. In an embodiment shown in FIG. 4, the lift propellers 108A, 108B, 108C are only arranged at the top side of the left linear support 103A. It should be noted that the number of the lift propeller shown in the figure is for illustrative purpose only, the utility model is not intended to limit the number of the lift propeller, and the lift propeller may be increased or decreased according to the demand in actual.

Likewise, the right linear support 103B is expected to be relative narrow in diameter, and may have a second group of multiple lift propellers 108D, 108E, and 108F arranged at the top side, the bottom side, or both, of the right linear support 103B. The second group of multiple lift propellers 108D, 108E, 108F may each have a radius of gyration. In one feasible embodiment, these lift propellers 108D, 108E, 108F may be driven by low profile motors arranged in a hollow interior of the right linear support. In an embodiment shown in FIG. 4, the lift propellers 108D, 108E, 108F are only arranged at the top side of the right linear support 103B. It should be noted that the number of the lift propeller shown in the figure is for illustrative purpose only, the utility model is not intended to limit the number of the lift propeller, and the lift propeller may be increased or decreased according to the demand in actual.

In one embodiment, below at least one lift propeller of the first group of multiple lift propellers 108A, 108B, 108C, preferably under at least one lift propeller of the first group of multiple lift propellers 108A, 108B, 108C, at least one air inlet is provided on the top side of the left linear support 103A.

In one possible implementation, a plurality of air inlets are provided on the left linear support 103A and the right linear support 103B respectively, the length directions of the air inlets on the left linear support 103A are parallel to the axis of the left linear support 103A, and the length directions of the air inlets on the right linear support 103B are parallel to the axis of the left linear support 103B. Illustratively, the plurality of air inlets on the left linear support 103A and the right linear support 103B are arranged in an array mode. As shown in FIG. 1b, the number of the air inlets at one side of the motor 190 is nine, and the nine air inlets are arranged in a rectangular array. By setting the number of the air inlet to multiple and arranging the multiple air inlets in an array manner, it is ensured that enough air is driven into the hollow interior of the linear support during the rotation of the lift propeller, and a heat dissipation rate of the linear support is guaranteed.

Further, at least one air outlet is provided on the left linear support 103A, thereby allowing the air to pass from the hollow interior of the left linear support 103A to the external environment.

As shown in FIG. 2 to FIG. 4, taking the left linear support 103A as an example, the front air inlet 170A and the rear air inlet 170B are provided under the lift propeller 108B and on the top side of the left linear support 103A, and in addition, a circular gap air outlet 200 is provided near a position near and surrounding a rotating shaft of the lift propeller 108B. After the lift propeller of the unmanned aerial vehicle starts to rotate, a downward-pressing wind field formed below the propeller and the airflow in the arm form a flow field, thereby accelerating airflow diffusion in the arm and achieving a heat dissipation effect on the arm.

In one embodiment, below at least one lift propeller of the second group of multiple lift propellers 108D, 108E, 108F, preferably under at least one lift propeller of the second group of multiple lift propellers 108E, 108E, 108F, at least one air inlet is provided on the top side of the right linear support 103B.

Further, at least one air outlet is provided on the right linear support 103B, thereby allowing the air to pass from the hollow interior of the right linear support 103B to the external environment.

Referring to FIG. 2 to FIG. 4, for symmetry reasons, at least one air inlet and at least one air outlet of the right linear support 103B may likewise be provided accordingly. After the lift propeller of the unmanned aerial vehicle starts to rotate, a downward-pressing wind field formed below the propeller and the airflow in the arm form a flow field, thereby accelerating airflow diffusion in the arm and achieving a heat dissipation effect on the arm.

In one embodiment, at least one air outlet is provided on the top side of each of the left linear support and the right linear support under the rotation of gyration. The air outlet is provided in such a way that the downward airflow generated by the propeller may accelerate the air flow around the hole area to facilitate the heat dissipation.

In one possible implementation, each of the left linear support 103A and the right linear support 103B is a closed cylinder, a cylinder wall of the cylinder is only provided with an air inlet and an installation hole, the air inlet is an oblong hole, a propeller hub of the lift propeller is located in the installation hole, and an air outlet is formed between the propeller hub of the lift propeller and the hole wall of the installation hole. It may be understood by those skilled in the art that the left linear support 103A and the right linear support 103B are provided as a closed cylinder and only provided with the air inlet and installation hole, the air may only flow through at least one air inlet and at least one air outlet 200, an air flow path in the linear support may be better regulated, thereby preventing interior airflow of the linear support from chaos to influence the air flow rate.

In another embodiment, at least one air outlet is provided on the bottom side of each of the left linear support 103A and the right linear support 103B. The utility model is not intended to limit the shape and the size of the air outlet, and those skilled in the art may set the shape and the size of the air outlet according to actual demands. Downward wind pressure is generated in the rotation process of the lift propeller to drive the gas to flow in from the air inlets 170A and 170B on the top of the linear support and to flow out from the air outlet at the bottom of the linear support, and the heat is taken away in the process that the gas flows in the hollow interior to achieve heat dissipation.

Preferably, the air outlet is located below the motor 190. It may be understood by those skilled in the art that the air outlet is located below the motor 190, in the process of flowing in from the air inlets 170A and 170B and flowing out from the air outlet, the gas passes through the surface of the motor 190 and has the shortest gas flow stroke, the heat emitted from the motor 190 is not easy to be transferred to the other positions in the linear support, and the cooling efficiency of the linear support is improved.

In one embodiment, the first group of multiple lift propellers and the second group of multiple lift propellers rotate to generate a downward airflow towards on at least one air inlet. Such arrangement of the air inlet makes a downward airflow generated by the rotation of the lift propeller enter the hollow interior of each of the left linear support and the right linear support more quickly, and the air flow in the hollow interior may be driven more quickly to take away the heat.

In one embodiment, at least one air inlet is provided below the outer 75% portion of the radius of gyration. As shown in FIG. 2b, at least one air inlet is provided on the linear support below the outer 75% portion of a radius of a propeller blade, and such arrangement may make the air flow into the interior of the linear support as quick as possible.

In one embodiment, at least one air outlet is provided below an inner 25% portion of the radius of gyration. Such arrangement of the air outlet makes the air in the linear support flow out more easily in the rotation process of the propeller.

In one embodiment, the main wing and the aileron are configured as a front wing configuration. Depending on the configuration of the front wing, the main wing and the aileron may be similarly designed, both as shown in the drawings, in a stretched flat plate shape, which may make the unmanned aerial vehicle more stable during the flight.

In one embodiment, at least one air outlet is a circular gap which surrounds a rotating shaft of at least one lift propeller of the first group of multiple lift propellers and the second group of multiple lift propellers. Therefore, a structure of the unmanned aerial vehicle may be changed to a lesser extent, and more arm space may not be occupied.

In one embodiment, at least one air inlet is an oblong hole. Such arrangement of the air inlet is in favor of air entry. However, the shape of the air inlet may be other shapes, such as a circle, an irregular shape, and the like, as long as air can enter.

In one embodiment, no other openings are provided on the left linear support and the right linear support, the air may only flow through the at least one air inlet and the at least one air outlet. Therefore, the air flow paths in the left linear support and the right linear support may be better regulated to prevent interior airflow chaos of the left linear support and the right linear support from affecting the air flow rate.

In one embodiment, the unmanned aerial vehicle 100 may have at least one propulsion propeller 100 to propel the unmanned aerial vehicle 100 in a forward direction. In an embodiment as shown in FIG. 4, there may have to propulsion propellers 170A, 170B. The two propulsion propellers 170A, 170B may by arranged on the distal ends of the rear portions of the linear supports 103A, 103B.

In still another embodiment, such as an embodiment shown in FIG. 34, the flight platform 101 may not have a propulsion propeller. In such an embodiment, the flight platform 101 may be attached to a passenger pod or a cargo pod, which is provided with the propulsion propeller. FIG. 35 illustrates an embodiment of a passenger pod with a propulsion propeller arranged at the rear end thereof. When the passenger pod is attached to the flight platform 101 of FIG. 34, the propulsion propeller forward propels the flight platform 101.

Two vertical stabilizers 106A, 106B may be arranged at positions near the rear ends of the linear support 103A, 103B respectively. Although the vertical stabilizers are shown pointing downward, there may have embodiments in which the vertical stabilizers point upward.

In another embodiment, the main wings 104A, 104B may be respectively provided with additional lift propellers 109A, 109B arranged at positions near the distal ends thereof. This may be achieved by providing wingtip vertical stabilizers 110A, 110B at the distal ends of the main wings 104A, 104B, respectively, and having the lift propellers 109 A, 109B arranged at the upper tips of the wingtip vertical stabilizers 110A, 110B. These wingtip lift propellers 109A, 109B may be relatively smaller than the lift propellers arranged on the linear supports 103A, 103B.

These wingtip lift propellers 109A, 109B may be used for efficiently and effectively controlling the roll of the unmanned aerial vehicle 100. These wingtip lift propellers 109A, 109B are located at the most distal positions away from the center axis of the unmanned aerial vehicle 100 and are effective in regulating the roll of the unmanned aerial vehicle 100, and may do so with a diameter smaller than those of the other lift propellers.

As further shown in FIG. 4, there is a pod 130 normally attached beneath a main body 102 of the unmanned aerial vehicle 100.

Now referring to details in FIG. 5, the unmanned aerial vehicle 100 is expected to use any type of landing gear. For example, tail ends of folding legs of the unmanned aerial vehicle may be provided with leaf springs or electric wheels. In one embodiment, the unmanned aerial vehicle 100 may have four single leaf springs 112A, 112B, 112C, 112D as the landing gears. The front two single leaf springs 112A, 112C are respectively arranged at the distal ends of folding legs 111A, 111B. During the flight, the folding legs 111A, 111B may be respectively retracted into interior spaces of the left linear support 103A and the right linear support 103B.

The two single leaf left springs 112B, 112D at the rear side are expected to be respectively arranged at the distal ends of the bottoms of the vertical stabilizers 106A, 106B.

The expected single leaf springs 112A, 112B, 112C, 112D may be made of appropriate materials to provide enough elasticity and integrity, the materials comprise natural and synthetic polymers, various metals and metallic alloy, natural materials, textile fibers, and all reasonable combination thereof. In one embodiment, carbon fibers are used.

Now turning to FIG. 6, a pod used as a cargo pod 130 is illustrated. The cargo pod 130 may have single leaf springs 135A, 135B, 135C, 135D as landing gears thereof. Or, the cargo pod 130 may have other type of landing gear, for example, sliding rails, legs, and wheels.

In an expected embodiment, the cargo pod 130 may be detached from the other portion of the unmanned aerial vehicle 100. The other portion of the unmanned aerial vehicle may be called as a flight platform 101. The flight platform 101 may fly without carrying the pod, and may interchangeably carry different pods. As will be described later, the flight platform 101 may carry a passenger pod.

In an illustrated example, all pods 130, 140 may be carried beneath the flight platform 101. The pods 130, 140 are expected to be loaded on the ground, and the loading process may be completed before or after attaching the flight platform 101 to the pods 130, 140.

FIG. 8 illustrates a top view of a flight platform 101. The flight platform 101 may have a generally flat configuration, and capable of carrying a load therebelow or thereabove. During high-speed flight, all six lift propellers 108A, 108B, 108C, 108D, 108E, 108F may be locked in place, and thus each blade is parallel to the main body 102.

FIG. 8 illustrates one embodiment of a flight platform 101, wherein the length of each of the front wings 105A, 105B is not longer than a half of the length of each of the main wings 104A, 104B.

FIG. 9 depicts a front view of a flight platform 101 with a detachably attached cargo pod 130 in general. Whether the cargo pod 130, the passenger pod 140, or any other type of load, it is specifically expected that there may be an energy storage unit 150 arranged in the main body 102 of the flight platform. Stored energy may be used to power the other parts of the flight platform, such as the lift propellers 108A, 108B, 108C, 108D, and the propulsion propellers 107A, 107B. The stored energy may be electric power, and the storage unit is a battery. In another embodiment, the energy storage 150 may be used to power accessories in the pods 130, 140.

These batteries 150 may also be arranged in the other portions of the flight platform 101, such as in the linear supports 103A, 103B.

Alternatively or preferably, there may be energy storage units 155 arranged in the pods 130, 140. Energy stored in the storage units 155 may be used to power the lift propellers 108A, 108B, 108C, 108D, and the propulsion propellers 107A, 107B. The stored energy may be electric power, and the storage unit is a battery. By arranging the energy storage units 155 in the pods 130, 140, whenever the flight platform 101 is attached to new pods 130, 140, the flight platform 101 will have a supplemental energy source. The flight platform 101 itself may be an emergency energy store or a battery 150 with smaller capacity to supply power to the flight platform 101 for a relatively short period of time when the flight platform 101 is in flight without the pods 130, 140. In one embodiment, the main power supply of the flight platform 101 is from the batteries 150 located in the pods 130, 140. In this way, the flight platform 101 or the entire VTOL unmanned aircraft system 100 will have a fully charged energy source when the flight platform 101 replaces the old pods 130, 140 with the new pods 130, 140. This is a beneficial method without requiring the VTOL unmanned aerial vehicle to charge itself. In a preferred embodiment, the flight platform 101 may work/fly continuously for hours or even days to attach the cargo pod/passenger pod and detach the cargo pod/passenger pod without stopping to charge batteries thereof.

Now referring to the details of FIG. 10, a passenger pod 150 is provided. The passenger pod 150 may use any type of landing gear, such as rigid legs 145A, 145B, 145C, 145D as shown in the figure.

FIG. 13 depicts one aspect of the utility model in general, wherein a pod (whether a cargo pod or a passenger pod) is detachable. Here, the passenger pod 140 may be selectively detached from the flight platform 101. The engagement and disengagement between the flight platform 101 and the pod 140 may be autonomously executed (without simultaneous user intervention) by a computer and/or other sensors and a calculation device. Alternatively or preferably, a user may actively control and guide the engagement and disengagement between the flight platform 101 and the pod 140.

As will be recognized by those of ordinary skill in the art, various types of engagement mechanisms 147 may be used to fix the pod 140 to the flight platform 101. For example, the engagement mechanism may be a mechanical latch, a magnetic latch, a track and groove, or a combination of any known engagement ways.

It is important to understand that, in addition to having two propulsion propellers 107A and 107B (as shown in FIG. 14), alternatively or alternatively, there may be a central propulsion propeller 117 which is connected to the rear end of the main body 102 (as shown in FIG. 15). As shown in FIG. 15, the central propulsion propeller 117 is engaged to the rear end of the main body 102 through a vertical expander 116. The vertical expander 116 may be any structure in any shape to physically engage with the propulsion propeller 117, thereby making a rotating center of the propulsion propeller 117 perpendicularly deviate from the main body 102. In still another embodiment, the propulsion propeller 117 perpendicularly deviates from the main body 102, thereby making the rotating center of the propulsion propeller 117 be perpendicularly located at a position at the rear portion of the pod 140 or be perpendicularly flushed with the pod 140. In another embodiment, the propulsion propeller 117 is perpendicularly flushed with the top of the pod 140. In another embodiment, the propulsion propeller 117 is perpendicularly flushed with the middle portion of the pod 140. In a further embodiment, the propulsion propeller 117 is perpendicularly flushed with the bottom of the pod 140.

What is not shown in any figure of the embodiment is the absence of the propulsion propellers 107A, 107B at the end parts of the linear supports 103A, 103B respectively. Instead, there may only be one propulsion propeller 117 engaged with the rear end of the main body 102.

It may also be contemplated that each of linear support 103A, 103B may comprise more than three lift propellers, which may be achieved by providing a longer linear support to accommodate more lift propellers, by using a lift propeller with smaller diameter, or by placing lift propellers on both the top and bottom sides of the linear support. One embodiment is illustrated in FIG. 16, wherein two additional lift propellers 108G 108H are arranged at the front ends of the bottoms of the linear supports 103A, 103B.

Although the propulsion propellers 107A, 107B have been illustrated in the previous figures to be positioned at the distal ends of the rear portions of the linear support 103A, 103B, it is particularly expected that these propulsion propellers 107A, 107B may be arranged at a horizontal plane lower than the main wings 104A, 104B, as those shown in FIG. 16. In one aspect, these propulsion propellers 107A, 107B may be arranged at a horizontal plane which is basically equal to pods 130, 140 carried by the flight platform. In another aspect, these propulsion propellers 107A, 107B may be arranged at the middles of the vertical stabilizers 106A, 106B. One expected reason for lowering the arrangement of the propulsion propellers 107A, 107B is to minimize head dipping effect during flight, which may be caused by aerodynamic effects caused by the pods 130, 140.

FIG. 17 to FIG. 33 illustrate an embodiment in which a flight platform 101 or pods 130, 140, or both, may each have electric wheels 148 attached thereto. In an embodiment of FIG. 17, the flight platform 101 is provided with the electric wheels 148; and each of the pods 130, 140 is also provided with the electric wheels. Now referring to an embodiment of the FIG. 18, single electric wheel 148 unit may be provided with a motor enclosed in a shell 149, and the motor may be driven by the power supplied by the energy storage unit 150 arranged in the pod 130 or 140.

It is contemplated that the electric wheels 148 may enable the flight platform 101 or the pod 130 to move on the ground when the flight platform and the pod are parked on the ground. This allows the one of pods 130, 140 to move away from the flight platform 101 and allows the other of the pods 130, 140 to move itself to the flight platform 101 for engagement.

Or, this may allow the flight platform 101 to be away from the pod 130 and to move towards another pod for engagement. In one embodiment, each of the pods 130, 140 may have an energy storage unit 155, and therefore, an energy source of the flight platform 101 is substantially supplemented when the flight platform 101 is engaged with a new and fully charged pod 130 or 140.

In certain embodiments of the disclosed unmanned aircraft system, at least one flotation device 160 may be provided, which is engaged with at least one of the cargo pod 130, the passenger pod 140, and the flight platform 101. The flotation device may be of the type that requires actuation, that is, active inflation with gas or through material when needed. In other words, in this particular embodiment, the flotation device 160 may remain in a deflated state and only expand when the inflation is triggered at certain conditions. For example, the flotation device 160 may automatically inflate during emergency landing, may automatically inflate when landing on water, and may inflate when any landing gear fails in certain aspects.

Many known types of inflation mechanisms or airbag mechanisms may be implemented to achieve the needs and configuration of the disclosed flotation device 160. The expected flotation device 160 may be of a type that can be repeatedly reused, re-inflated, and re-deflated. The expected flotation device 160 may be merely disposable.

Alternatively or preferably, an inflation behavior may be activated by a user. For example, when an operator of the unmanned aircraft system determines that the flotation device 160 needs to be inflated, he or she may send a signal to start the inflation.

It should be particularly noted in certain embodiments that the flotation device 160 does not need the electric wheel 148. In other embodiments, the flotation device 160 is a part of a shell of the electric wheel 148.

Referring to FIG. 29 as one example, a passenger pod 140 may have a lengthened type flotation device 160 arranged on any side of the pod 140, which may be used as a water landing gear. In FIG. 29, these flotation devices 160 are shown deflated. FIG. 35 illustrates a side view of a deflated flotation device 160. As shown in FIG. 36 and FIG. 37, the flotation device 160 engaged with the passenger pod 140 is shown inflated.

Referring FIG. 34 as another example, the flight platform 101 may have four flotation devices 160 arranged on the tops of four electric wheels 148 respectively. These flotation devices 160 may be alternatively attached to the electric wheels 148 or close to the electric wheels 148 at the other positions. In FIG. 34, these flotation devices 160 engaged with the electric wheels 148 are shown deflated. FIG. 33 and FIG. 34 illustrate inflated flotation devices 160 of the flight platform 101.

FIG. 38 is a schematic view of a cooling system for an unmanned aerial vehicle in accordance with one embodiment of the one aspect of the utility model. As shown in FIG. 38, a cooling system for an unmanned aerial vehicle is illustrated by way of example only, which comprises a plurality of lift propellers 108B and 108C which are arranged on a linear support 103A, the linear support 103A being hollow and accommodating a plurality of motors 190 to drive the plurality of lift propellers 108B and 108C; and a plurality of air inlets 170A and 170B which are provided on the top side of the linear support 103A, and provided below the plurality of lift propellers 108B and 108C, which rotate to generate a downward airflow onto the plurality of air inlets 170A and 170B, thereby enabling the air to escape from the hollow interior of the linear support 103A to an external environment through an air outlet 200. It should be noted that the configuration of the lift propellers and the air inlets illustrated in FIG. 38 are for illustrative purposes only, and may be flexibly changed according to actual applications.

Heat dissipation in the arm of the unmanned aerial vehicle may be achieved by adopting the cooling system for the unmanned aerial vehicle provided by the utility model.

In one embodiment, the air outlet is provided on the linear support and close to one of the plurality of motors. Such arrangement of the air outlet may take away the heat generated by the motors and electronic speed controllers better.

In one embodiment, no other openings for air circulation are provided on the portion, which is not the linear support below, of the lift propeller. Therefore, air flow paths in the left linear support and the right linear support may be better regulated to prevent interior air chaos of the left linear support and the right linear support from affecting a heat dissipation effect.

In one embodiment, the downward airflow enters through the plurality of air inlets and flows through at least one motor of the plurality of motors. Due to the fact that the air may only escape from the air outlet, the downward airflow may enter through the plurality of air inlets, and is guided to pass through at least one motor of the plurality of motors to take away the heat generated by the motor, thereby cooling the motor.

In one embodiment, the air outlet is a circular gap surrounding a shaft of at least one motor of the plurality of motors. Therefore, the structure of the unmanned aerial vehicle may be changed to a lesser extent, and more arm space cannot be occupied.

Many variations and modifications may be made by those of ordinary skill in the art without departing from the spirit and scope of the disclosed embodiments. Thus, it must be understood that the illustrated embodiments are presented for the purpose of example only and should not be taken as limiting the embodiments defined by the appended technical solutions. For example, despite the fact that elements of the technical solutions are presented below in a certain combination, it must be expressly understood that the embodiment comprises other combinations of less, more or different elements, which are disclosed herein, even if such a combination is not initially defined.

Therefore, detailed embodiments and applications of a VTOL flight platform with interchangeable pods have been disclosed. However, it is apparent to those skilled in the art that more modifications in addition to those already described are possible without departing from the concepts disclosed herein. Thus, the disclosed embodiments are not limited except in the spirit of the appended technical solutions. In addition, in interpreting the specification and technical solutions, all terms should be interpreted as the broadest possible manner consistent with the context. Particularly, the terms "comprise" and "comprising" should be interpreted as referring to components, assemblies, or steps in a non-exclusive manner, indicating that the referenced components, assemblies, or steps may be present, or utilized, or combined with other components, assemblies, or steps that are not expressly referenced. Insubstantial variations from the claimed subject matter now known or later expected by those of ordinary skill in the art are expressly expected to be equivalent within the scope of the technical solutions. Thus, obvious replacements which are known at present or later to those of ordinary skill in the art are defined to be within the scope of the defined elements. Thus, the technical solutions should be understood to encompass what is specifically illustrated and described above, what is conceptually equivalent, what may be obviously replaced, and what essentially comprise the basic idea of the embodiments. In addition, in the case that the specification and technical solutions refer to at least one selected from a group consisting of A, B, C, . . . and N, the text should be interpreted as requiring at least one element of the group, including N, rather than A plus N, or B plus N, or the like.

What is claimed is:

1. A vertical takeoff and landing unmanned aerial vehicle, comprising:
    a left main wing and a right main wing;
    a main body which is engaged with the left main wing and the right main wing;
    a left linear support connected to the left main wing;
    a right linear support for connected to the right main wing;
    a first group of multiple lift propellers arranged on the left linear support, a first lift propeller in the first group of multiple lift propellers has a radius of gyration;
    a second group of multiple lift propellers which are arranged on the right linear support, each lift propeller in the second group of multiple lift propellers having a radius of gyration;
    wherein the left linear support and the right linear support each having a hollow interior;
    wherein a first motor is arranged in the hollow interior of the left linear support to drive the first lift propeller;
    at least one air inlet disposed below the first lift propeller in the first group of multiple lift propellers and said at least one air inlet is provided on a top side of the left linear support; and
    at least one air outlet disposed below the first lift propeller on the top side of the left linear support;
    wherein the at least one air inlet is disposed directly below an outer 75% portion of a radius of gyration of the first propeller, thereby allowing a high pressure downward airflow created by a gyration of the first propeller to naturally drive a flow of air into the hollow interior via the at least one air inlet to create pressurized air in the hollow interior;
    wherein the at least one air outlet is disposed directly below an inner 25% portion of the radius of gyration of the first propeller, and a space directly below said inner 25% portion of the radius has a low pressure downward air flow, thereby allowing pressurized air within the hollow interior to naturally escape from said hollow interior to an ambient environment through said at least one air outlet; thereby directing the flow of air to pass to and from the first motor.

2. The vertical takeoff and landing unmanned aerial vehicle according to claim 1, wherein the at least one air outlet is a circular gap which surrounds a rotating shaft of the first lift propeller.

3. The vertical takeoff and landing unmanned aerial vehicle according to claim 1, wherein the at least one air inlet is an oblong hole.

4. The vertical takeoff and landing unmanned aerial vehicle according to claim 1, wherein no other openings are provided on the left linear support and the right linear support, and thus the flow of air may only flow through the at least one air inlet and the at least one air outlet.

5. The vertical takeoff and landing unmanned aerial vehicle according to claim 1, wherein the left linear support is provided with an installation hole, a propeller hub of the first lift propeller is located in the installation hole, and an air outlet is formed between the propeller hub of the first lift propeller and an edge of the installation hole.

6. The vertical takeoff and landing unmanned aerial vehicle according to claim 1, wherein the left linear support has two terminal ends, and each of the two terminal ends is formed as a tapered structure.

7. A cooling system for an unmanned aerial vehicle, comprising:
    a plurality of lift propellers arranged on a linear support of the unmanned aerial vehicle;
    wherein the linear support has a hollow interior and contains a plurality of motors to drive the plurality of lift propellers;
    at least one air inlet disposed below a first lift propeller of the plurality of lift propellers and said at least one air inlet is provided on a top side of the linear support;
    wherein the first lift propeller is driven by a first motor of the plurality of motors; and
    at least one air outlet disposed below the first lift propeller on the top side of the linear support;
    wherein the at least one air inlet is disposed directly below an outer 75% portion of a radius of gyration of the first propeller, thereby allowing a high pressure downward airflow created by a gyration of the first propeller to naturally drive a flow of air into the hollow interior via the at least one air inlet to create pressurized air in the hollow interior;
    wherein the at least one air outlet is disposed directly below an inner 25% portion of the radius of gyration of the first propeller, and a space directly below said inner 25% portion of the radius has a low pressure air flow, thereby allowing pressurized air within the hollow interior to naturally escape from said hollow interior to an ambient environment through said at least one air outlet.

8. The cooling system for the unmanned aerial vehicle according to claim 7, wherein the downward airflow enters through the at least one air inlet and flows to at the first motor.

9. The cooling system for the unmanned aerial vehicle according to claim 8, wherein the at least one air outlet is a circular gap surrounding a shaft of at least one motor in the plurality of motors.

* * * * *